(12) United States Patent
Qiao et al.

(10) Patent No.: US 11,856,470 B2
(45) Date of Patent: *Dec. 26, 2023

(54) REGISTRATION REQUEST INDICATING FAILURE OF NETWORK

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Vienna, VA (US); Jinsook Ryu, Oakton, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,420

(22) Filed: Nov. 21, 2022

(65) Prior Publication Data

US 2023/0092577 A1 Mar. 23, 2023

Related U.S. Application Data

(63) Continuation of application No. 17/497,478, filed on Oct. 8, 2021, now Pat. No. 11,510,127, which is a
(Continued)

(51) Int. Cl.
*H04W 36/30* (2009.01)
*H04W 36/14* (2009.01)
(Continued)

(52) U.S. Cl.
CPC ......... *H04W 36/305* (2018.08); *H04W 36/14* (2013.01); *H04W 60/04* (2013.01); *H04W 84/042* (2013.01)

(58) Field of Classification Search
CPC ... H04W 84/042; H04W 36/14; H04W 60/04; H04W 48/16; H04W 36/305
(Continued)

(56) References Cited

U.S. PATENT DOCUMENTS 9,426,727 B2 8/2016 Smith et al.
9,642,077 B2 5/2017 Mathai et al.
(Continued)

FOREIGN PATENT DOCUMENTS

CN 101031145 A 9/2007
CN 102726098 A 10/2012
(Continued)

OTHER PUBLICATIONS

3GPP TS 22.011 V16.4.0 (Dec. 2018); 3rd Generation Partnership Project; Technical Specification Group Services and System Aspects; Service accessibility (Release 16).
(Continued)

*Primary Examiner* — Margaret G Mastrodonato
(74) *Attorney, Agent, or Firm* — Peter Flanagan; Kavon Nasabzadeh; Philip R. Smith

(57) ABSTRACT

A base station of a first public land mobile network (PLMN) transmits, to a wireless device, an indication of a failure of a second PLMN comprising a PLMN identifier of the second PLMN. The base station receives, from the wireless device, a registration request indicating the failure of the second PLMN. The registration request comprises one or more of a subscriber concealed identifier (SUCI) or a permanent equipment identifier (PEI) of the wireless device. The registration request comprises the PLMN identifier of the second PLMN.

20 Claims, 26 Drawing Sheets

Related U.S. Application Data continuation of application No. PCT/US2020/041428, filed on Jul. 9, 2020.

(60) Provisional application No. 62/872,099, filed on Jul. 9, 2019.

(51) Int. Cl.
*H04W 60/04* (2009.01)
*H04W 84/04* (2009.01)

(58) Field of Classification Search
CPC ..... H04W 48/18; H04W 88/06; H04W 24/08; H04W 4/50; H04W 76/19; H04W 76/25; H04W 60/005; H04W 8/02
See application file for complete search history.

(56) References Cited

U.S. PATENT DOCUMENTS

| | | |
|---|---|---|
| 2008/0013470 A1 | 1/2008 | Kopplin |
| 2011/0096750 A1 | 4/2011 | Velandy et al. |
| 2011/0098050 A1 | 4/2011 | Eipe et al. |
| 2013/0121207 A1 | 5/2013 | Parker |
| 2013/0124712 A1 | 5/2013 | Parker |
| 2013/0136032 A1 | 5/2013 | Meirosu et al. |
| 2014/0194123 A1 | 7/2014 | Wang et al. |
| 2015/0195706 A1 | 7/2015 | Luft et al. |
| 2017/0251071 A1 | 8/2017 | Kenjo et al. |
| 2017/0367036 A1 | 12/2017 | Chen et al. |
| 2018/0176981 A1 | 6/2018 | Baer |
| 2018/0288828 A1 | 10/2018 | Combellas et al. |
| 2019/0174449 A1 | 6/2019 | Shan et al. |
| 2020/0259896 A1 | 8/2020 | Sachs et al. |
| 2021/0029628 A1 | 1/2021 | Kim et al. |
| 2021/0392605 A1 | 12/2021 | Park et al. |
| 2022/0167185 A1 | 5/2022 | Kim et al. |

FOREIGN PATENT DOCUMENTS

| | | |
|---|---|---|
| CN | 104081826 A | 10/2014 |
| CN | 108574969 A | 9/2018 |
| EP | 2 445 244 B1 | 5/2016 |
| EP | 3 937 545 A1 | 1/2022 |
| WO | 2011/083664 A1 | 7/2011 |
| WO | 2019/122494 A1 | 6/2019 |
| WO | 2020/141956 A1 | 7/2020 |
| WO | 2020/141964 A1 | 7/2020 |
| WO | 2020/141965 A1 | 7/2020 |
| WO | 2020/204309 A1 | 10/2020 |
| WO | 2020/204310 A1 | 10/2020 |
| WO | 2020/204536 A1 | 10/2020 |
| WO | 2020/213816 A1 | 10/2020 |
| WO | 2020/213817 A1 | 10/2020 |
| WO | 2020/218764 A1 | 10/2020 |
| WO | 2020/218910 A1 | 10/2020 |

OTHER PUBLICATIONS

3GPP TR 23.715 V16.0.0 (Sep. 2018); 3rd Generation Partnership Project; Technical Specification Group Services and System Aspects; Study on system enhancements for provision of access to restricted local operator services by an unauthenticated User Equipment (UE) (Release 16).
3GPP TS 24.301 V14.4.0 (Jun. 2017); 3rd Generation Partnership Project; Technical Specification Group Core Network and Terminals; Non-Access-Stratum (NAS) protocol for Evolved Packet System (EPS); Stage 3 (Release 14).
3GPP TS 38.331 V15.5.1 (Apr. 2019); 3rd Generation Partnership Project; Technical Specification Group Radio Access Network; NR; Radio Resource Control (RRC) protocol specification (Release 15).
3GPP TR 22.831 V0.1.0 (May 2019); 3rd Generation Partnership Project; Technical Specification Group Services and System Aspects; Study on Support for Minimization of Service Interruption (Release 17).
S1-191422 (was 068); 3GPP TSG-SA WG Meeting #86; Suzhou, China, May 6-10, 2019; Title: Network reselection during disaster—Non-disaster area; Agenda Item: 8.8 FS_MINT; Source: LG Electronics, LG Uplus, KT Corp, SK Telecom, Hansung University; Contact: sungduck.chun@lge.com.
S1-191426 (was 067); 3GPP TSG-SA WG Meeting #86; Suzhou, China, May 6-10, 2019; Title: Network reselection during disaster—General; Agenda Item: 8.8 FS_MINT; Source: LG Electronics, LG Uplus, KT Corp, SK Telecom, Hansung University; Contact: sungduck.chun@lge.com.
S1-191428 (was 069); 3GPP TSG-SA WG Meeting #86; Suzhou, China, May 6-10, 2019; Title: Network reselection during disaster with previous reject; Agenda Item: 8.8 FS_MINT; Source: LG Electronics, LG Uplus, KT Corp, SK Telecom, Hansung University; Contact: sungduck.chun@lge.com.
S1-191583 was452 (was 072); 3GPP TSG-SA WG Meeting #86; Suzhou, China, May 610, 2019; Title: Return to Home Network after disaster period; Agenda Item: 8.8 FS_MINT; Source: LG Electronics, LG Uplus, KT Corp, SK Telecom, Hansung University; Contact: sungduck.chun@lge.com.
S1-191584 (revision of S1-191108); 3GPP TSG-SA WG1 Meeting #86; Suzhou, China, May 6-10, 2019; Title: FS_MINT 22831 P-CR: Disaster Begins and Ends Use Cases; Agenda Item: 8.8; Source: Samsung; Contact: Erik Guttman <erik.guttman@samsung.com>.
S1-191585 (revision of S1-191425, rev 103); 3GPP TSG-SA WG1 Meeting #86; Suzhou, China, May 6-10, 2019; Title: Use case on "backup" PLMN for international roamer; Agenda item: 8.8 FS_MINT; Source: Huawei; Contact: Carry Liu (Liujianning.liu@huawei.com).
S2-184523 (revision of S2-184028, 3519); SA WG2 Meeting #127; Apr. 16-20, 2018, Sanya, P.R. of China; Source: Motorola Mobility, Lenovo, NEC; Title: PLMN selection and radio access for RLOS; Document for: Approval; Agenda Item: 6.16; Work Item / Release: FS_PARLOS / Rel-16.
S2-186938 (revision of S2-18xxxx); SA WG2 Meeting #128; Jul. 2-6, 2018, Vilnius, Lithuania; Source: Motorola Mobility, Lenovo, Qualcomm, Charter Communications, Nokia, Nokia Shanghai Bell, Intel, Sprint; Title: Update to Solution 9 to enhance the congestion control description; Document for: Approval; Agenda Item: 6.16; Work Item / Release: FS_PaRLOS/Rel-15.
S1-191424 (revision of S1-191099); 3GPP TSG-SA WG1 Meeting #86; Suzhou, China, May 6-10, 2019; Title: Use case for HPLMN failure with part of CN still working; Agenda item: 8.8 FS_MINT; Source: Huawei; Contact: Carry Liu (Liujianning.liu@huawei.com).
S1-191582 was429 (was 070); 3GPP TSG-SA WG Meeting #86; Suzhou, China, May 6-10, 2019; Title: Network protection in case of surge of incoming users caused by disaster; Agenda Item: 8.8 FS_MINT; Source: LG Electronics, LG Uplus, KT Corp, SK Telecom, Hansung University; Contact: sungduck.chun@lge.com.
International Search Report and Written Opinion for Application No. PCT/US2020/041428, dated Oct. 22, 2020.
R2-2202263; 3GPP TSG-RAN WG2 Meeting #117-e; Electronic, Feb. 17, 2022-Mar. 3, 2022; Change Request; 38.331; CR 2883 rev; Current version: 16.7.0.
3GPP TS 23.501 V17.3.0 (Dec. 2021); Technical Specification; 3rd Generation Partnership Project; Technical Specification Group Services and System Aspects; System architecture for the 5G System (5GS); Stage 2; (Release 17).
Office Action, dated Feb. 12, 2023, in CN Patent Application No. 202080050028X.

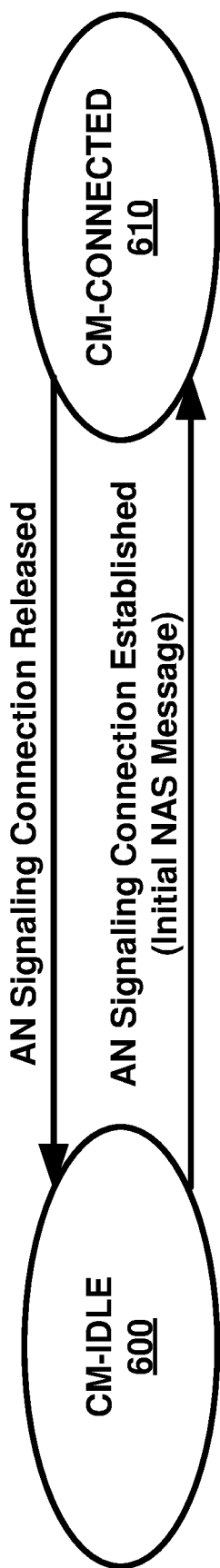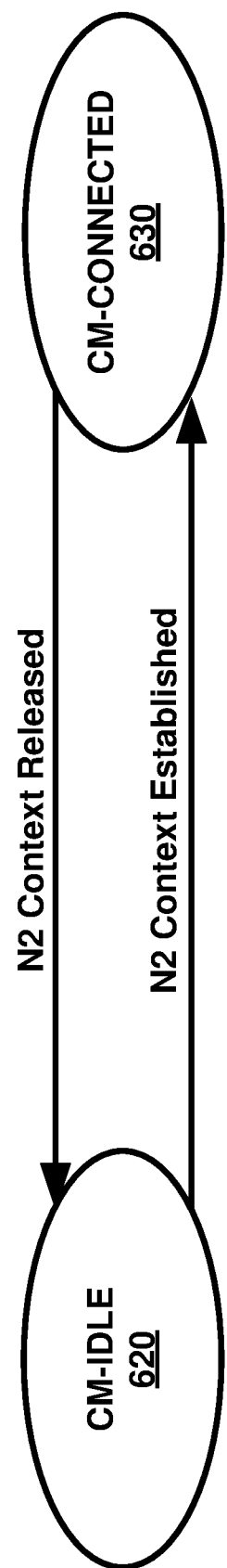
FIG. 6A CM State Transition in UE
FIG. 6B CM State Transition in AMF (R)AN Receive, by a base station of a first public land mobile network (PLMN), a request indicating: a failure of a second PLMN providing services to a wireless device in a coverage area in response to a disaster; and a second PLMN identifier of the second PLMN

↓

Determine, by the base station parameters of access control, e.g. cell barring (e.g. AC Barring for MO Data), access class barring (e.g. access class 12 is barred), service specific access control barring

↓

Transmit by the base station to the wireless device, a SIB/MIB message comprising a network disaster indication; allowed service information; the identifier of the second PLMN; or an identifier of the first PLMN.

↓

Receive, by the base station from the wireless device, a registration request message comprising a disaster PLMN indication, the identifier of the disaster PLMN; or a establish cause indicating establishment of an RRC connection to the serving PLMN during the disaster of home PLMN.

FIG. 17

REGISTRATION REQUEST INDICATING FAILURE OF NETWORK

CROSS-REFERENCE TO RELATED APPLICATIONS

This application is a continuation of U.S. patent Ser. No. 17/497,478, filed Oct. 8, 2021, which is a continuation of International Application No. PCT/US2020/041428, filed Jul. 9, 2020, which claims the benefit of U.S. Provisional Application No. 62/872,099, filed Jul. 9, 2019, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 6A and FIG. 6B depict two connection management state models in UE and AMF as per an aspect of embodiments of the present disclosure.

FIG. 17 is an example diagram depicting the procedures of (R)AN as per an aspect of an embodiment of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to network reselection during disaster (e.g. for 5G or future communication system). Throughout the present disclosure, UE, wireless device, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 1:
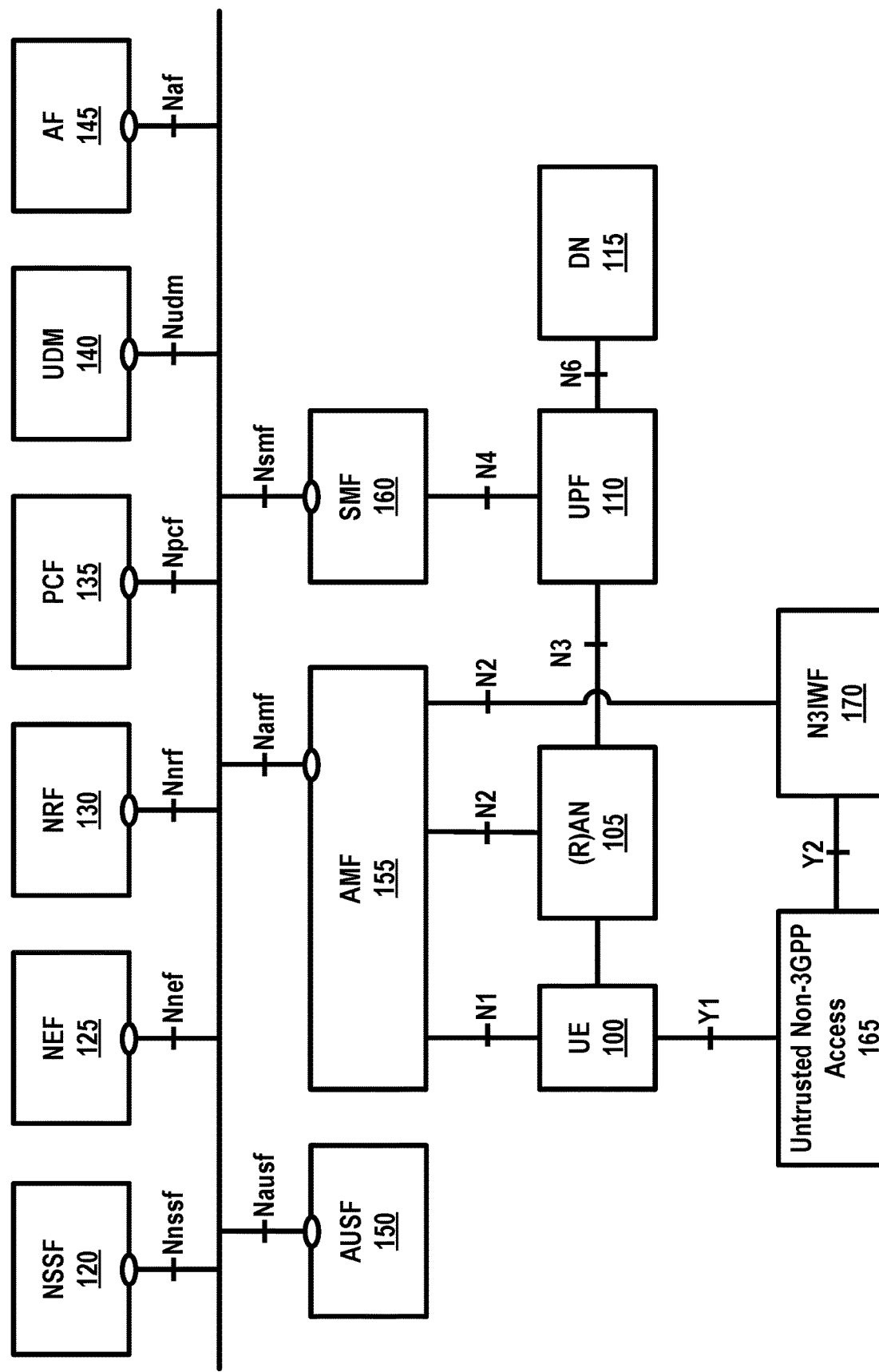
FIG. 1 is a diagram of an example 5G system architecture as per an aspect of an embodiment of the present disclosure.
Figure 2:
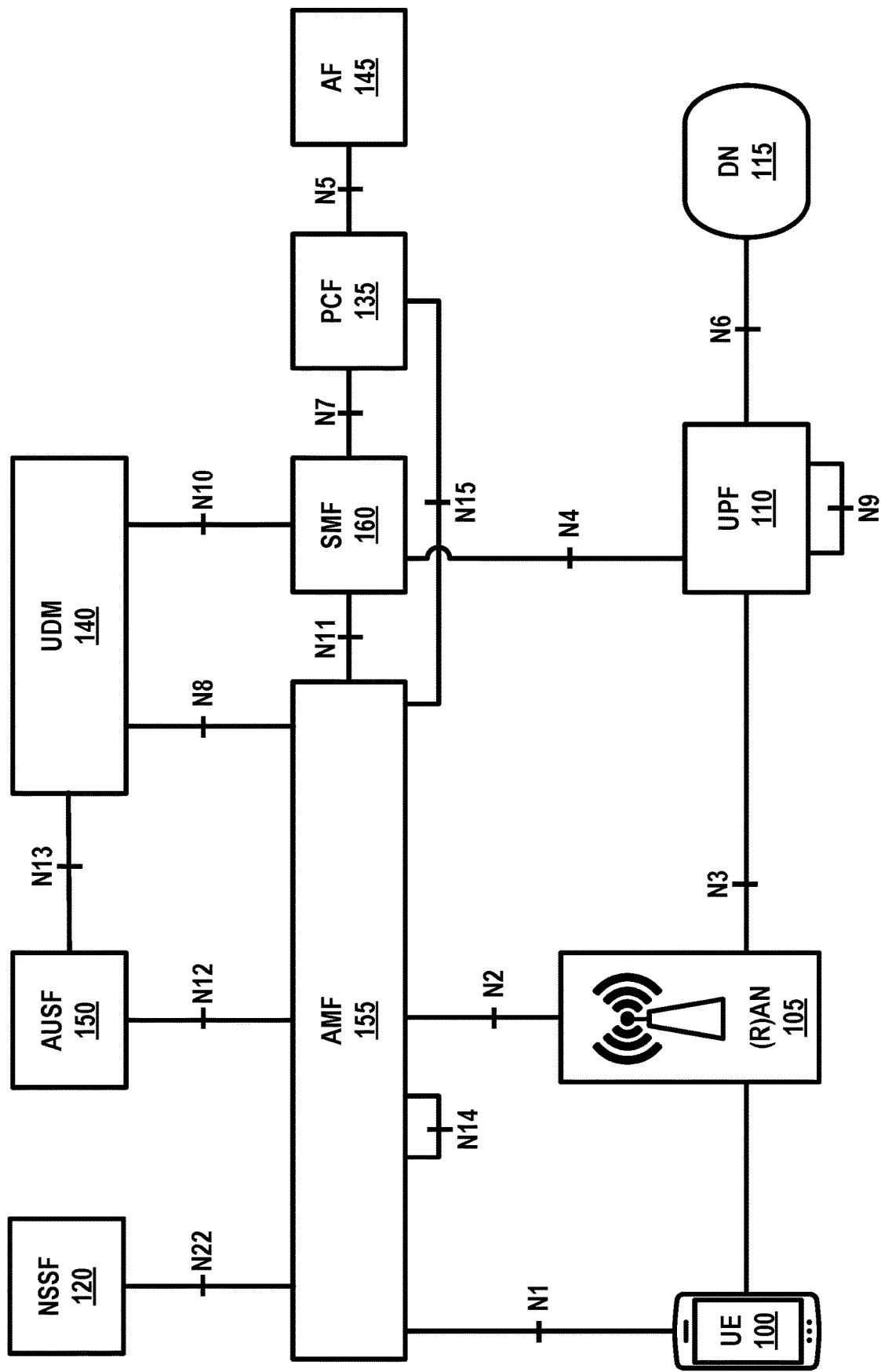
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMBR Aggregate Maximum Bit Rate
AMF Access and Mobility Management Function
AN Access Network
APN Access Point Name
ARP Allocation and Retention Priority
BD Billing Domain
CDR Charging Data Record
CHF Charging Function
CN Core Network
CP Control Plane
CSP Communication Service Provider
DDoS Distributed Denial of Service
DL Downlink
DN Data Network
DN-AAA Data Network Authentication Authorization and Accounting
DNN Data Network Name
DRB Data Radio Bearers
eMBB enhanced Mobile Broadband
EPS Evolved Packet System
FDD Frequency Division Duplex
FQDN Fully Qualified Domain Name
GFBR Guaranteed Flow Bit Rate
GPSI Generic Public Subscription Identifier
GW Gateway
HTTP Hypertext Transfer Protocol
ID Identifier
IMS IP Multimedia core network Subsystem
IoT Internet of Things IP Internet Protocol
IP-CAN IP Connectivity Access Network
KPI Key Performance Indicator
L2 Layer 2 (data link layer)
L3 Layer 3 (network layer)
LADN Local Area Data Network
LAN local area network
MAC Media Access Control
MFBR Maximum Flow Bit Rate
MIB Master Information Block
MICO Mobile Initiated Connection Only
MIoT Massive IoT
N3IWF Non-3GPP InterWorking Function
NAS Non Access Stratum
NAT Network address translation
NEF Network Exposure Function
NF Network Function
NR New Radio
NG-RAN NR Radio Access Network
NRF Network Repository Function
NSI Network Slice Instance
NSSAI Network Slice Selection Assistance Information
NSSF Network Slice Selection Function
NTP Network Time Protocol
NWDAF Network Data Analytics Function
OAM Operation Administration and Maintenance
PCC Policy and Charging Control
PCF Policy Control Function
PDU Packet Data Unit
PEI Permanent Equipment Identifier
PLMN Public Land Mobile Network
QCI QoS Class Identifier
QFI QoS Flow Identifier
QoS Quality of Service
RA Random Access
RAN Radio Access Network
RAT Radio Access Technology
RRC Radio Resource Control
RM Registration Management
SBA Service Based Architecture
SIB System Information Block
SLA Service Level Agreement
SM Session Management
SMF Session Management Function
SMSF SMS Function
S-NSSAI Single Network Slice Selection Assistance information
SS Synchronization Signal
SSC Session and Service Continuity
SUPI Subscriber Permanent Identifier
TA Tracking Area
TAI Tracking Area Identity
TCP Transmission Control Protocol
UAV Unmanned Aerial Vehicles
UAS Unmanned Aircraft Systems
UDR Unified Data Repository
UDM Unified Data Management
UDP User Datagram Protocol
UE User Equipment
UL Uplink
UL CL Uplink Classifier
UPF User Plane Function
URLLC Ultra-Reliable Low Latency Communication
URSP UE Route Selection Policy
UTC Coordinated Universal Time
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
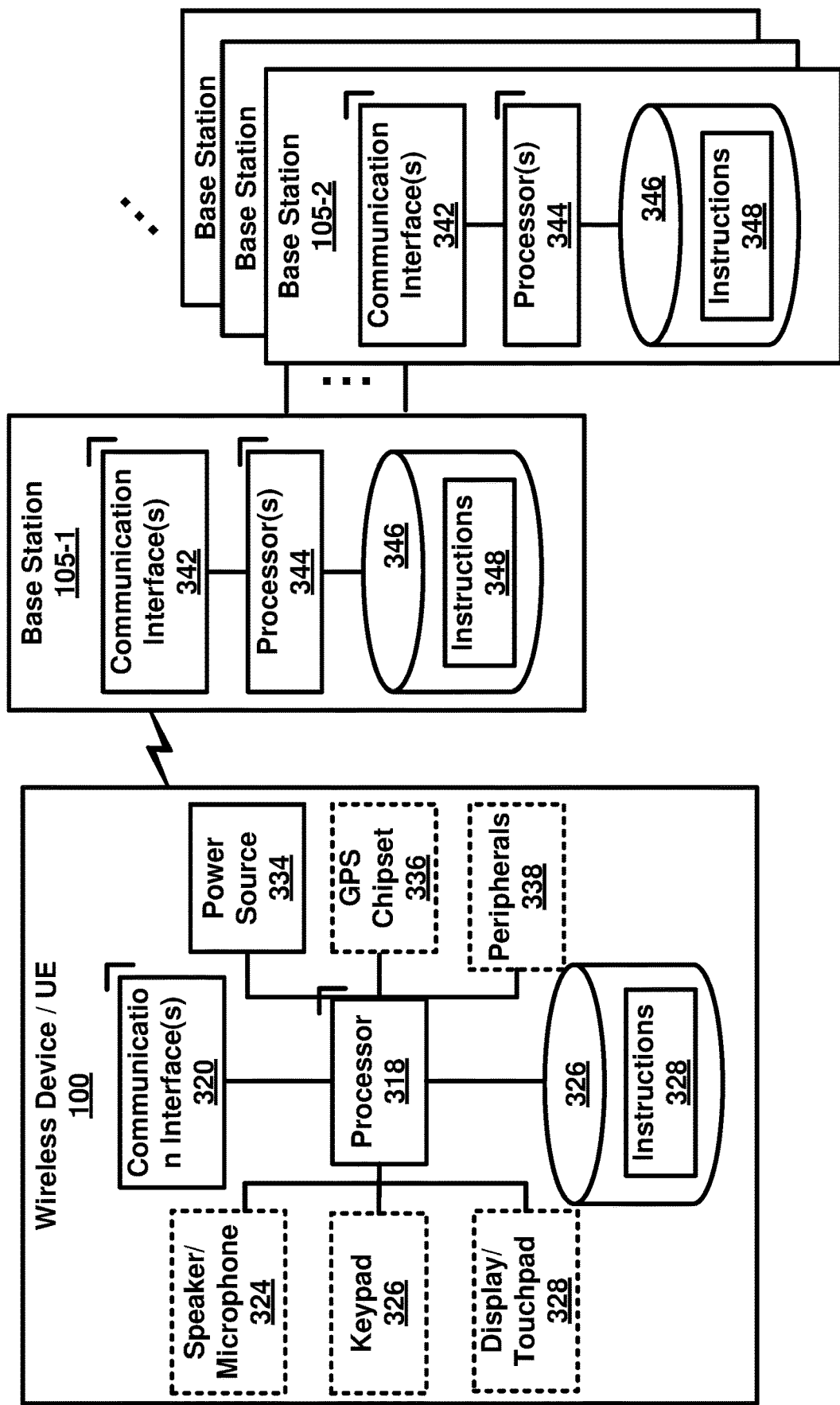
FIG. 3 is a system diagram of an example wireless device and a network node in a 5G system as per an aspect of an embodiment of the present disclosure.
Figure 4:
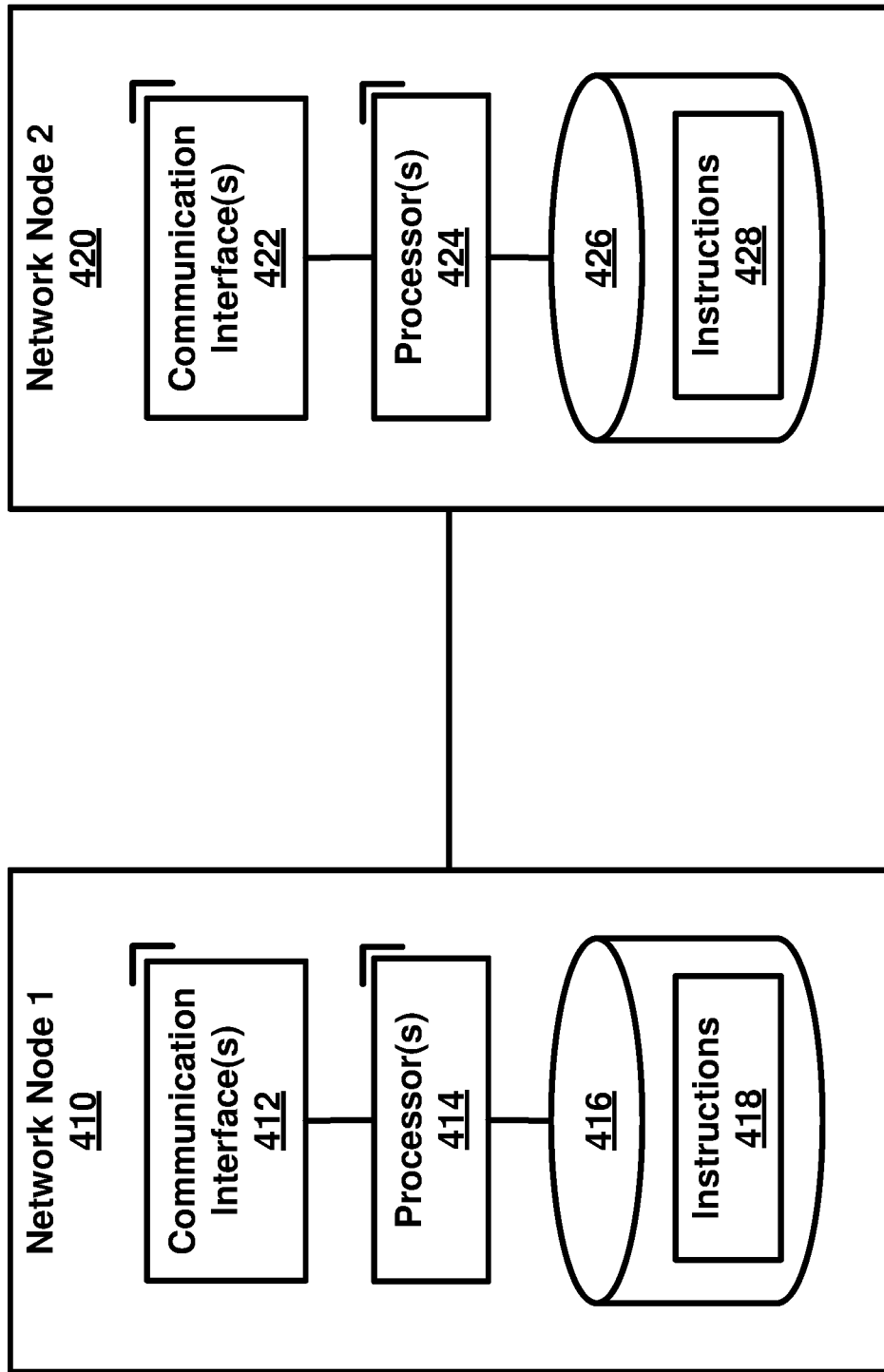
FIG. 4 is a system diagram of an example network nodes as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of an SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
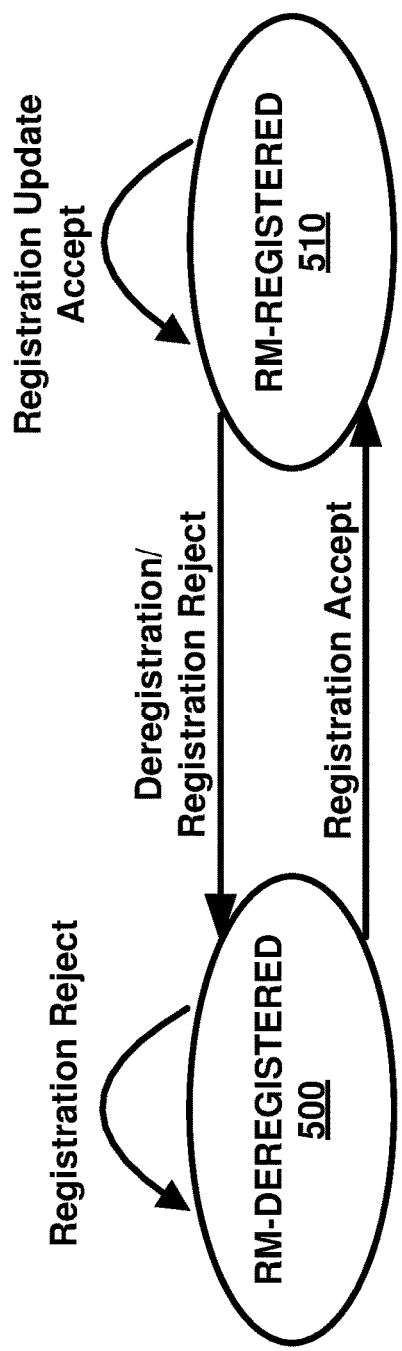
FIG. 5A and FIG. 5B depict two registration management state models in UE and AMF as per an aspect of embodiments of the present disclosure.
Figure 5B:
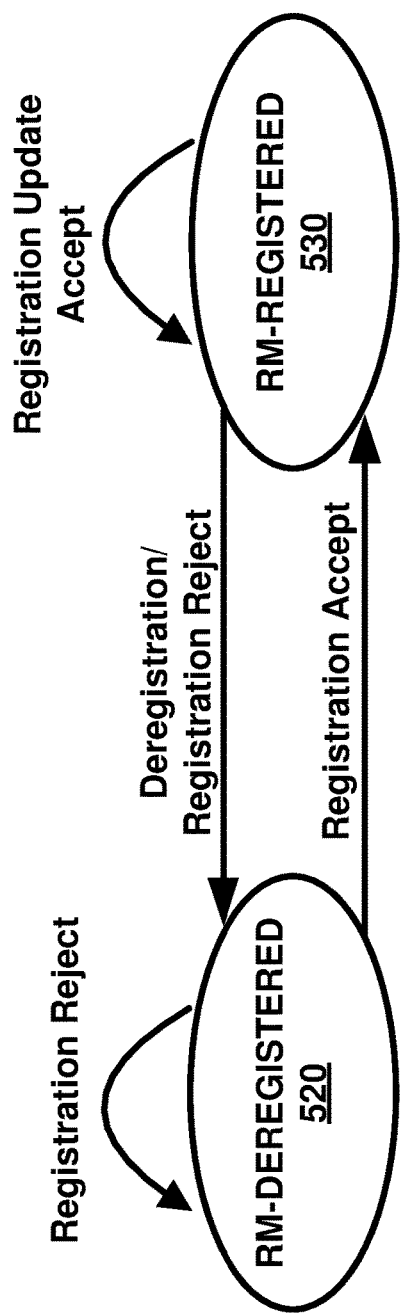

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
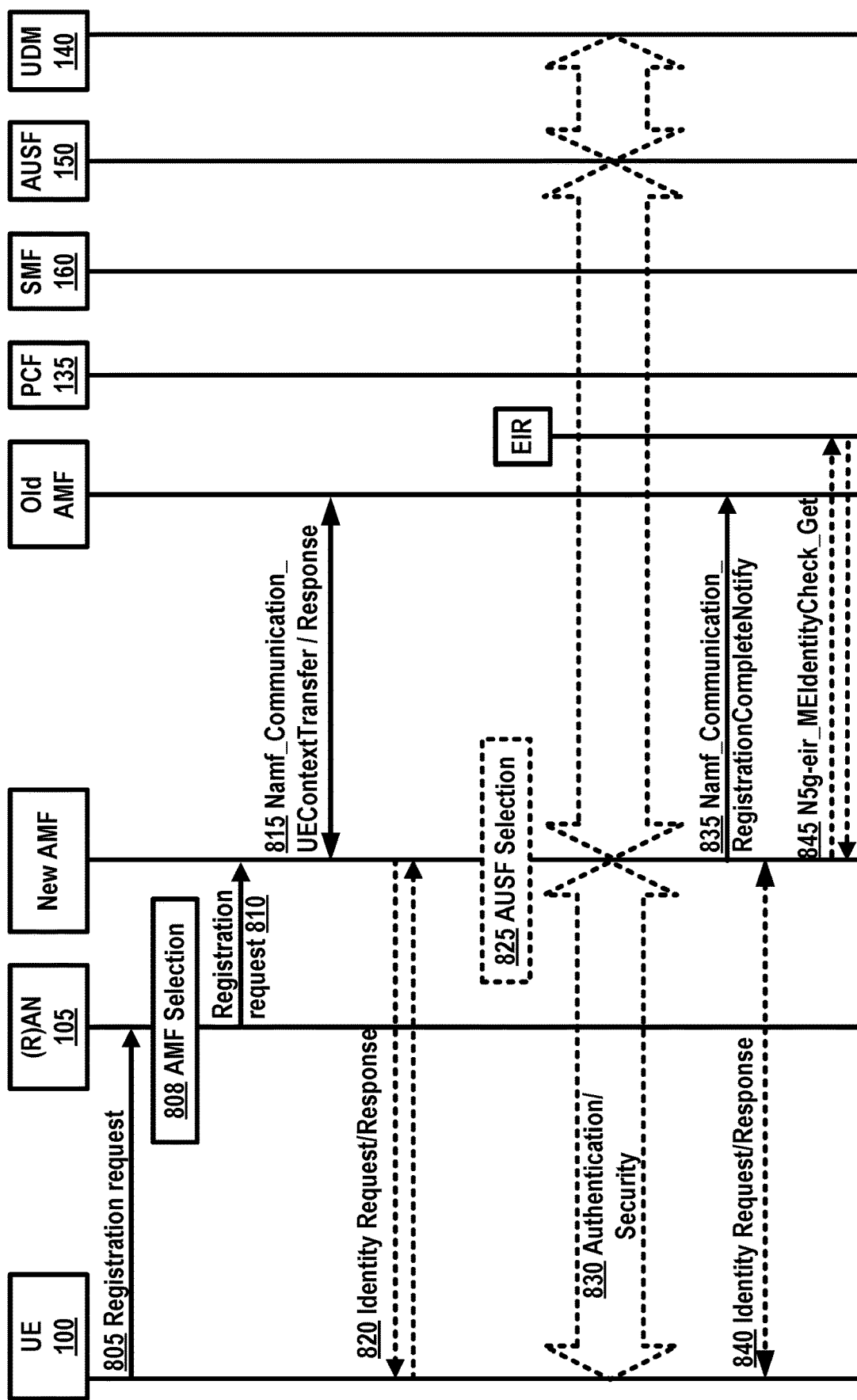
FIG. 8 is an example call flow diagram of registration procedures as per aspects of embodiments of the present disclosure.
Figure 9:
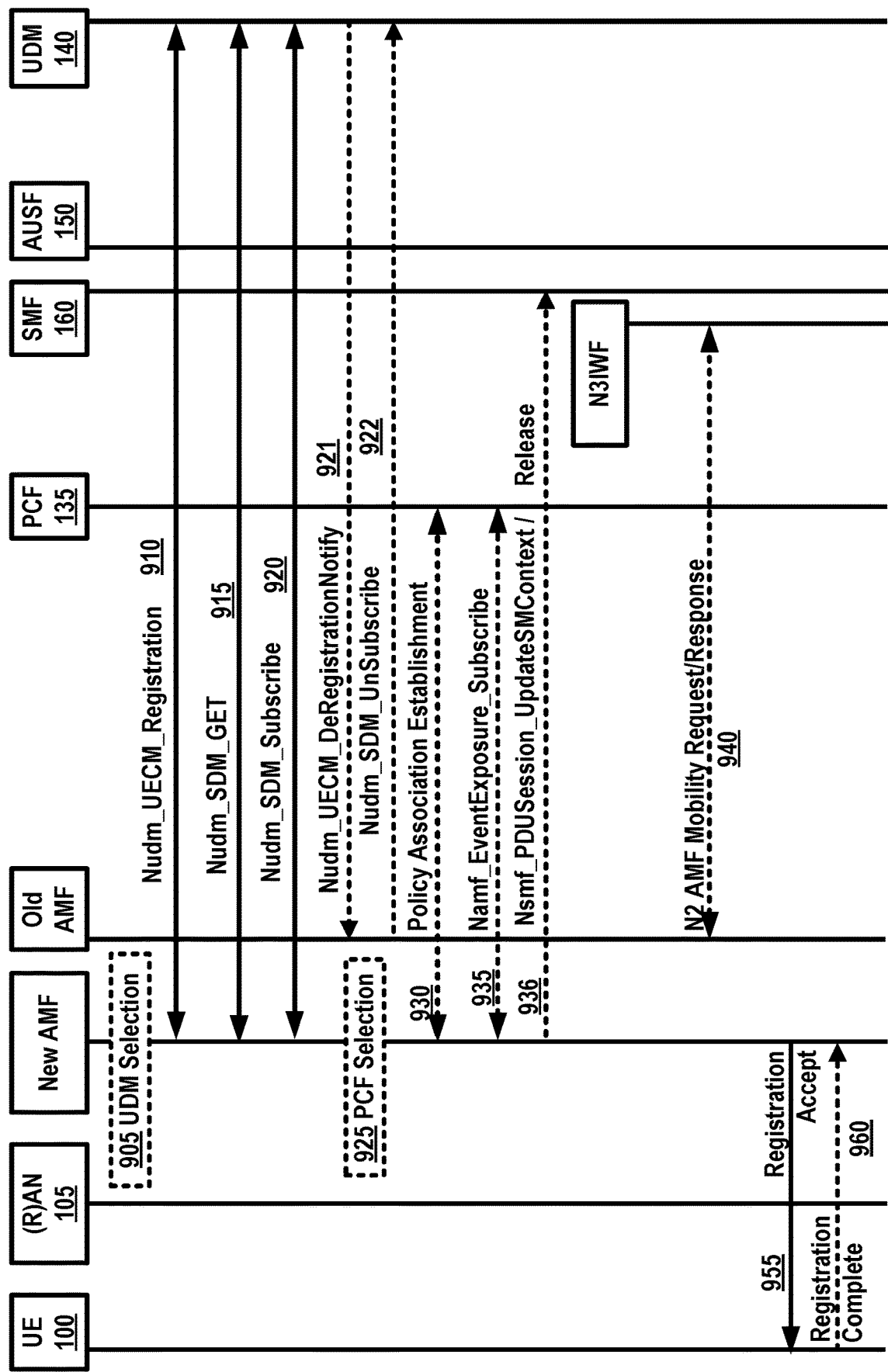
FIG. 9 is an example call flow diagram of registration procedures as per aspects of embodiments of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
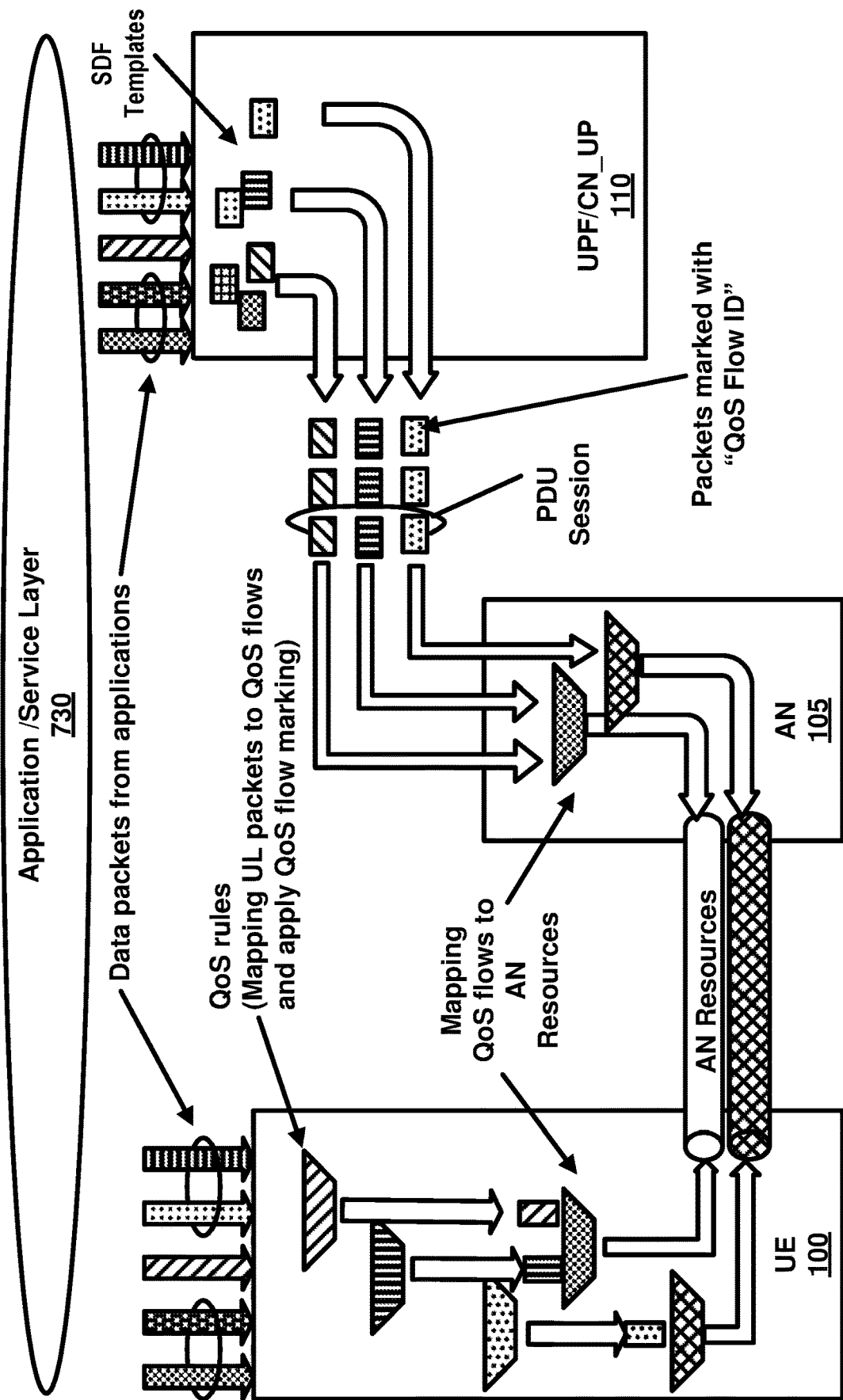
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer.

The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection.

In an example, the (R)AN 105 may send to the new AMF 155 an N2 message (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request). In an example, if the UE's 5G-GUTI was included in the registration request and the serving AMF 155 has changed since last registration procedure, the new AMF 155 may invoke the Namf_Communication_UEContextTransfer service operation on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure may be initiated by the AMF 155 sending an identity request message to the UE 100 requesting the SUCI.

In an example, the UE 100 may respond with an identity response message including the SUCI. The UE 100 may derive the SUCI by using the provisioned public key of the HPLMN.

In an example, the AMF 155 may decide to initiate UE 100 authentication by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check by invoking the N5g-eir_EquipmentIdentityCheck Get service operation.

In an example, the new AMF 155, based on the SUPI, may select a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get. The UDM 140 may retrieve this information from UDR by Nudr_UDM_Query (access and mobility subscription data). After a successful response is received, the AMF 155 may subscribe to be notified using Nudm_SDM_Subscribe when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select a PCF 135.

In an example, the new AMF 155 may perform a policy association establishment during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation for UE 100 event subscription.

In an example, the AMF 155 may send to the SMF 160 an Nsmf_PDUSession_UpdateSMContext. In an example, the AMF 155 may invoke the Nsmf_PDUSession_UpdateSM- Context if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response.

In an example, the new AMF 155 may send to the UE 100 a registration accept (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155 In an example, the UE 100 may send to the new AMF 155 a registration complete message. In an example, the UE 100 may send the registration complete message to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
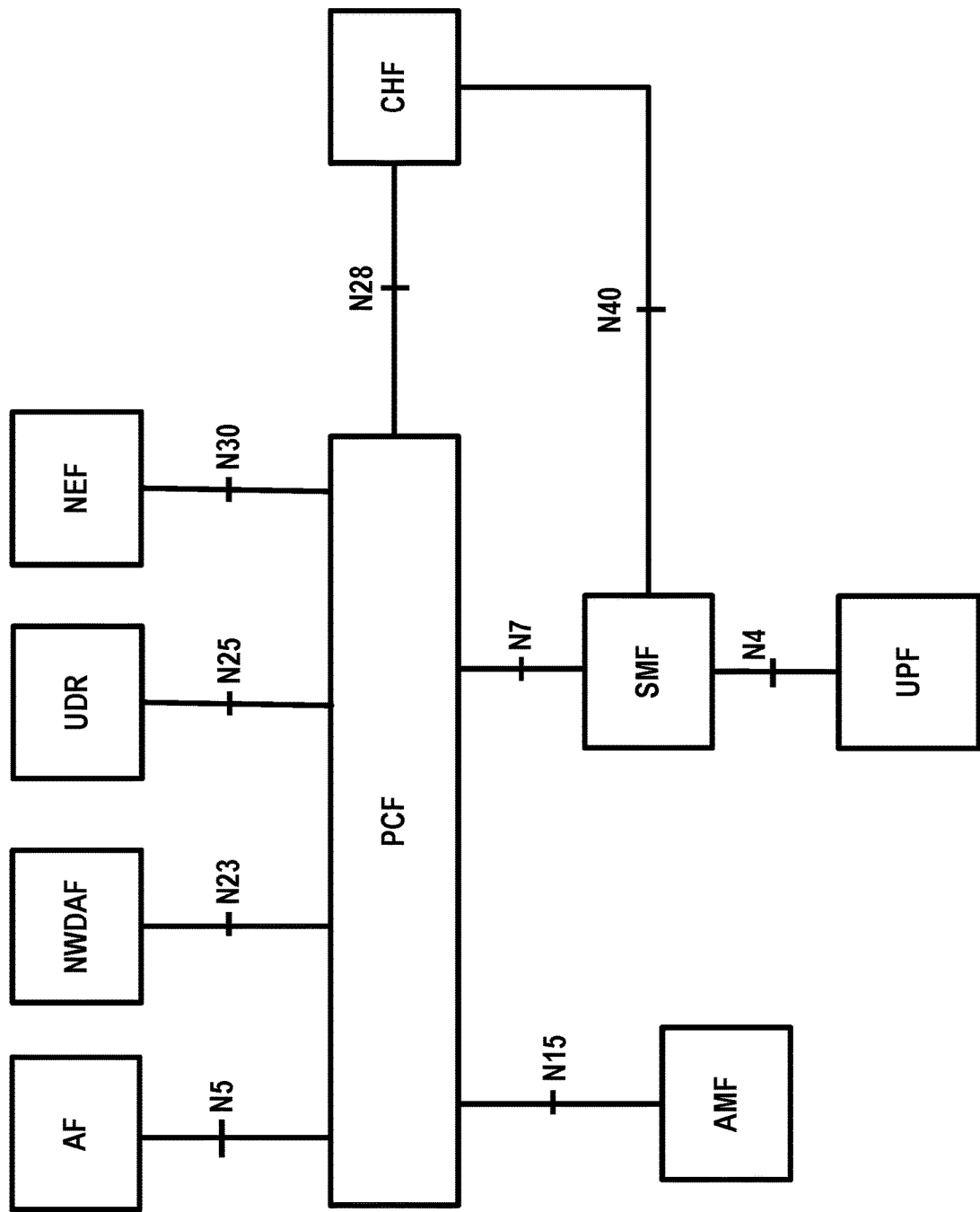
FIG. 10 is a diagram of an example 5G policy and charging control system architecture as per an aspect of an embodiment of the present disclosure.

FIG. 10 is an example diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging.

In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered.

In an example, online charging may be a process where charging information for network resource usage may be collected concurrently with that resource usage in the same fashion as in offline charging. Authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required.

In an example, converged charging may be a process where online and offline charging may be combined.

Figure 11:
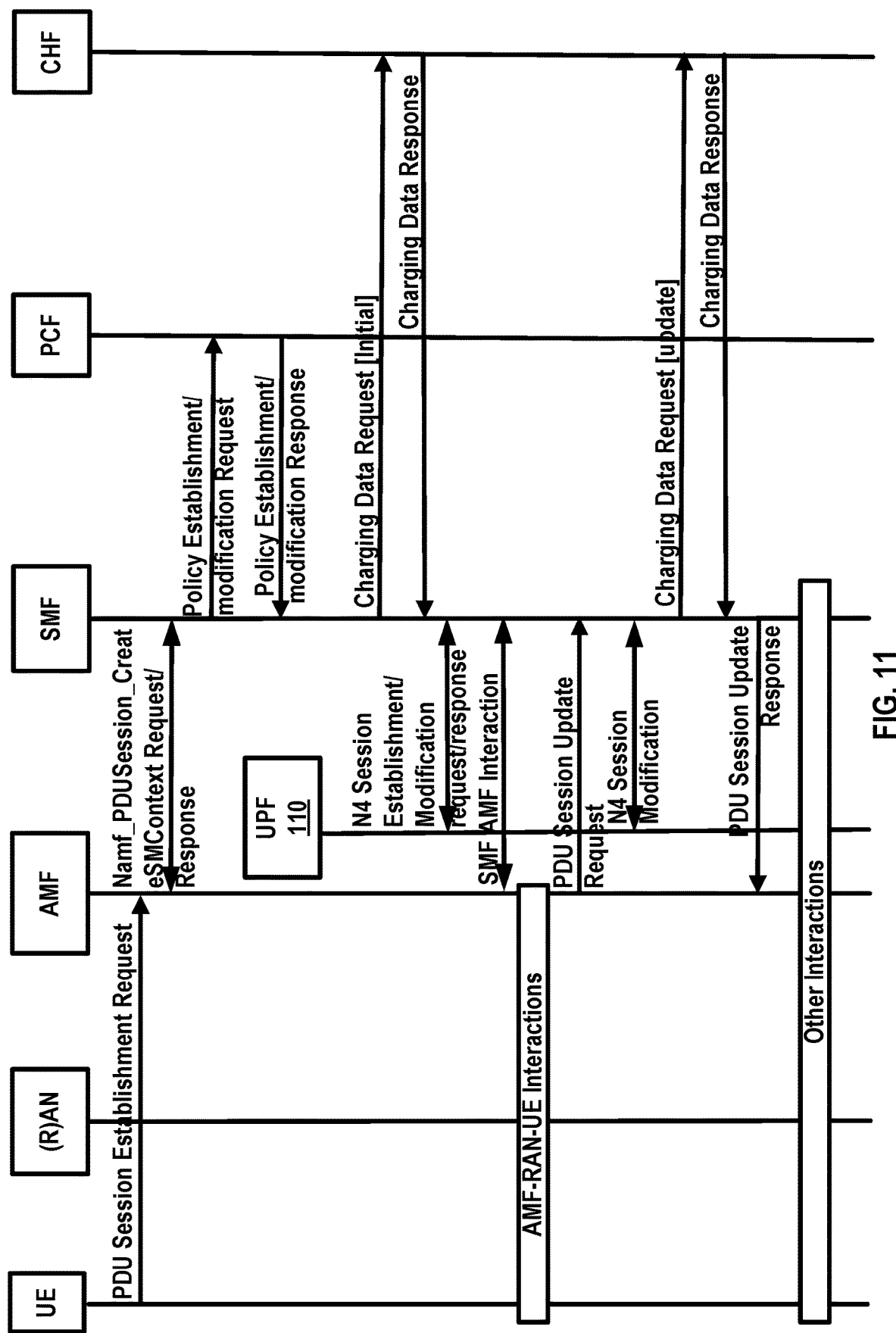
FIG. 11 is an example call flow for PDU session establishment charging as per an aspect of an embodiment of the present disclosure.

FIG. 11 is an example call flow for PDU session establishment charging as per an aspect of an embodiment of the present disclosure.

In an example, a UE may initiate a PDU Session establishment procedure by sending a PDU Session Establishment Request message to an AMF. The PDU Session Establishment Request message may comprise one or more of: PDU session ID, PDU Type, SSC mode, User location information, and Access Technology Type Information.

In response to the message received from the UE, an AMF may select an SMF and send to the selected SMF a message (e.g. Namf_PDUSession_CreateSMContext Request). The message sent to the SMF may be used by the AMF to request establishing the PDU session. In response to receiving the message from the AMF, the SMF may send a response message (e.g. Namf_PDUSession_CreateSMContext Response) to the AMF to indicate whether the request from the AMF is accepted or not.

In an example, the SMF may select a PCF and send to the PCF a message (e.g. SM Policy Association Establishment Request) to request PCC rules. The PCF may provide PCC rules in a response message (e.g. SM Policy Association Establishment response) to the SMF.

In an example, the SMF may create a Charging Id for the PDU session and may send a Charging Data Request [initial] message to a CHF to verify authorization of a subscriber of the UE to start the PDU session which is triggered by start of PDU session charging event.

In an example, the CHF may open a charging data record (CDR) for the PDU session and may acknowledge the Charging Data Request message by sending Charging Data Response to the SMF.

In an example, the SMF selects a UPF and may initiate an N4 Session Establishment/Modification procedure with the selected UPF.

The SMF may interact with the AMF. For example, the SMF may send to the AMF a Namf_Communication_N1N2MessageTransfer message comprising one or more of: PDU session ID, QoS Profile(s), CN Tunnel Info, and S-NSSAI from the Allowed NSSAI. This SMF/AMF interaction is labeled in FIG. 11 as SMF AMF Interaction.

In an example, the AMF may interact with the (R)AN and the UE. This interaction is labeled in FIG. 11 as AMF-RAN-UE Interactions. As part of the AMF-RAN-UE Interactions, the AMF may interact with the (R)AN and the UE by sending to the (R)AN a N2 PDU Session Request message comprising the information received from the SMF that indicates the PDU session establishment is accepted.

In an example, and as further part of the AMF-RAN-UE Interactions, the (R)AN may send to the AMF a N2 PDU Session Response message comprising one or more of: PDU session ID, N2 SM information (PDU session ID, AN Tunnel Info, List of accepted/rejected QFI(s)), wherein the AN Tunnel Info may correspond to the Access Network address of the N3 tunnel corresponding to the PDU Session.

In an example, the AMF may send to the SMF a PDU Session Update Request message (e.g. Nsmf_PDUSession_UpdateSMContext Request message) comprising the N2 SM information received from the (R)AN to the SMF.

In an example, the SMF may initiate an N4 Session Modification procedure with the UPF. As part of the N4 Session Modification procedure, the SMF may provide AN Tunnel Info to the UPF as well as the corresponding forwarding rules, and the UPF may send to the SMF a response message.

In an example, the SMF may request quota from CHF, e.g. "start of service data flow" event may need quota from CHF. The SMF may send a message to the CHF (e.g. Charging Data Request [update]). In an example, for online charging or converged charging, the SMF may request quota from CHF when allocated quota is consumed or a trigger is met to request a quota.

In an example, the UPF may report resource usage of a PDU session to the SMF. In an example, the UPF may report resource usage of a wireless device to the SMF. by enforcing the charging control rules, the SMF may send to the CHF a message (e.g. Charging Data Request [update]) comprising resource usage information received from the UPF.

In an example, the CHF may update CDR for this PDU session. The CHF may acknowledge the SMF by sending a Charging Data Response message.

In an example, the SMF may send to the AMF a Nsmf_PDUSession_UpdateSMContext Response message.

In an example, other interactions may be performed between SMF, AMF, (R)AN and UE for the PDU session establishment procedure, this interaction is labeled in FIG. 11 as Other Interactions.

In an example, 5GC may be able to provide policy information from a PCF to a UE, and such policy information may include Access Network Discovery & Selection Policy (ANDSP) and/or UE Route Selection Policy (URSP).

In an example, the ANDSP is used by the UE for selecting non-3GPP accesses and for selection of the N3IWF in a PLMN. In an example, the URSP is used by the UE to determine if a detected application may be associated to an established PDU Session, may be offloaded to non-3GPP access outside a PDU Session, or may trigger the establishment of a new PDU Session. In an example, the URSP rules may include traffic descriptors that specify the matching criteria and one or more of the following components: SSC Mode Selection Policy (SSCMSP), Network Slice Selection Policy (NSSP), DNN Selection Policy, PDU Session Type Policy, Non-seamless Offload Policy, and/or Access Type preference. In an example, the SSCMSP is used by the UE to associate the matching application with SSC modes. In an example, the NSSP is used by the UE to associate the matching application with S-NSSAI. In an example, the DNN Selection Policy is used by the UE to associate the matching application with DNN. In an example, the PDU Session Type Policy is used by the UE to associate the matching application with a PDU Session Type. In an example, the Non-seamless Offload Policy is used by the UE to determine that the matching application should be non-seamlessly offloaded to non-3GPP access (i.e. outside of a PDU Session). In an example, the Access Type preference may indicate the preferred Access Type (3GPP or non-3GPP) If the UE needs to establish a PDU Session for the matching application, this. In an example, the ANDSP and URSP may be pre-configured in the UE or may be provisioned to UE from PCF. The pre-configured policy may be applied by the UE when it has not received the same type of policy from PCF. In an example, the PCF may select the ANDSP and URSP applicable for a UE based on local configuration, Subscribed S-NSSAIs and operator policies taking into consideration e.g. accumulated usage, load level information per network slice instance, UE location. In an example, in the case of a roaming UE, the V-PCF may retrieve ANDSP and URSP from the H-PCF over N24/Npcf. When the UE is roaming and the UE has valid rules from both HPLMN and VPLMN the UE may give priority to the valid ANDSP rules from the VPLMN.

In an example, the ANDSP and URSP may be provided from the PCF to an AMF via N15/Namf interface and then from AMF to the UE via the N1 interface. The AMF may not change the ANDSP and the URSP provided by PCF.

In an example, the PCF may be responsible for delivery of UE policy. If the PCF is notified UE Policy delivery failure (e.g. because of UE unreachable), the PCF may subscribe the "Connectivity state changes (IDLE or CONNECTED)" event. After reception of the Notify message indicating that the UE enters the CM-Connected state, the PCF may retry to deliver the UE Policy.

Based on the subscription, during the operation phase, the operator may create/activate multiple new network slice instances (NSIs) or allocate existing NSIs. For one or more of the NSIs, the operator may collect charging information and enable charging information collection based on subscription and actual usage. If the measurement method for the charging information is usage, the operator may collect the NSI's usage for CSP. If the measurement method for the chagrining information is performance data, the operator may collect performance data.

A single UE may simultaneously be served by one or more network slice instances via a 5G-AN. In an example, a single UE may be served by k network slices (e.g. k=8, 16, etc.) at a time. An AMF instance serving the UE logically belongs to a Network Slice instances serving the UE.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a Network Slice. An S-NSSAI may be comprised of: a slice/service type (SST), which may refer to the expected Network Slice behavior in terms of features and services; and/or a slice differentiator (SD). A slice differentiator may be optional information that complements the slice/service type(s) to allow further differentiation for selecting an network slice instance from potentially multiple network slice instances that comply with the indicated slice/service type. This information may be referred to as SD. The same Network Slice instance may be selected employing different S-NSSAIs. The CN part of a Network Slice instance(s) serving a UE may be selected by CN.

Subscription data may include the S-NSSAI(s) of the Network Slices that the UE subscribes to. One or more S-NSSAIs may be marked as default S-NSSAI. In an example, k S-NSSAI may be marked Default S-NSSAI (e.g. k=8, 16, etc.). In an example, the UE may subscribe to more than 8 S-NSSAI.

A UE may be configured by the HPLMN with a Configured NSSAI per PLMN. Upon successful completion of a UE's Registration procedure, the UE may obtain from the AMF an Allowed NSSAI for this PLMN, which may include one or more S-NSSAIs.

The Allowed NSSAI may take precedence over the Configured NSSAI for this PLMN. The UE may use the S-NSSAIs in the Allowed NSSAI corresponding to a Network Slice for the subsequent Network Slice selection related procedures in the serving PLMN.

The establishment of user plane connectivity to a data network via a network slice instance(s) may comprise one or more of the following steps: performing a RM procedure to select an AMF that supports the required Network Slices; establishing one or more PDU session to the required Data network via the Network Slice Instance(s).

When a UE registers with a PLMN, if the UE for this PLMN has a configured NSSAI or an allowed NSSAI, the UE may provide to the network in RRC and NAS layer a Requested NSSAI containing the S-NSSAI(s) corresponding to the slice(s) to which the UE attempts to register, in addition to the temporary user ID if one was assigned to the UE. The Requested NSSAI may be either: the Configured-NSSAI; the Allowed-NSSAI.

In an example, when a UE registers with a PLMN, if for this PLMN the UE has no Configured NSSAI or Allowed NSSAI, the RAN may route NAS signalling from/to this UE to/from a default AMF.

The network, based on local policies, subscription changes and/or UE mobility, may change the set of permitted Network Slice(s) to which the UE is registered. The network may perform such change during a Registration procedure or trigger a notification towards the UE of the change of the supported Network Slices using an RM procedure (which may trigger a Registration procedure). The Network may provide the UE with a new Allowed NSSAI and Tracking Area list.

During a Registration procedure in a PLMN, in case the network decides that the UE should be served by a different AMF based on Network Slice(s) aspects, then the AMF that first received the Registration Request may redirect the Registration request to another AMF via the RAN or via direct signaling between the initial AMF and the target AMF.

The network operator may provision the UE with Network Slice selection policy (NSSP). The NSSP includes one or more NSSP rules. An NSSP rule may associate an application with a certain S-NSSAI. A default rule which matches one or more applications to a S-NSSAI may also be included. When a UE application associated with a specific S-NSSAI requests data transmission, then:

If the UE has one or more PDU sessions established corresponding to the specific S-NSSAI, the UE may route the user data of this application in one of these PDU sessions, unless other conditions in the UE prohibit the use of these PDU sessions. If the application provides a DNN, then the UE may consider also this DNN to determine which PDU session to use.

If the UE does not have a PDU session established with this specific S-NSSAI, the UE may request a new PDU session corresponding to this S-NSSAI and with the DNN that may be provided by the application. In order for the RAN to select a proper resource for supporting network slicing in the RAN, RAN may be aware of the Network Slices used by the UE.

The AMF may select an SMF in a Network Slice instance based on S-NSSAI, DNN and other information e.g. UE subscription and local operator policies, when the UE triggers the establishment of a PDU session. The selected SMF may establish a PDU session based on S-NSSAI and DNN.

In an example, in order to support network-controlled privacy of slice information for the slices the UE accesses, when the UE is aware or configured that privacy considerations apply to NSSAI: The UE may not include NSSAI in NAS signaling unless the UE has a NAS security context and the UE may not include NSSAI in unprotected RRC signaling.

For roaming scenarios, the Network Slice specific network functions in VPLMN and HPLMN may be selected based on the S-NSSAI provided by the UE during PDU connection establishment. If a standardized S-NSSAI is used, then selections of slice specific NF instances may be done by each PLMN based on the provided S-NSSAI. Otherwise, the VPLMN may map the S-NSSAI of HPLMN to a S-NSSAI of VPLMN based on roaming agreement (including mapping to a default S-NSSAI of VPLMN). The selection of slice specific NF instance in VPLMN may be done based on the S-NSSAI of VPLMN. The selection of any slice specific NF instance in HPLMN may be based on the S-NSSAI of HPLMN.

When a UE is located within its home network coverage, the UE may camp on its home network. In normal situation where its home network is functioning properly, the neighboring network may reject a service request from the UE except the case when it is required by regulation e.g. for emergency call. In an example, when the home network is disabled due to disasters (e.g., earthquake, flood, conflagration, etc.) and when other neighboring networks are not impacted or available, a possible option for the UE to be online may be to be served by the neighboring networks. Subject to regulatory requirements or operator's policy, 3GPP system may be able to support a UE of a given PLMN is able to obtain connectivity service (e.g. voice call, mobile data service) from another PLMN of same country when disaster condition is met.

In normal situation where the home network is properly functioning, the neighboring network may not be required to provide service to users which are not its own subscribers. In an example, for the area where one network is not providing coverage due to reasons other than disaster, the neighboring network may not be required to provide connectivity service for the other network's users. In an example, if the home network is experiencing some problem within some specific area due to the disaster, the neighboring network may not be required to provide service to other network's users if the user is located outside of the specific area.

In an example, the Country K is composed of three city, called OldCity, NearCity, FarCity. Due to some reasons, the network HomeNetwork has not yet installed equipment within FarCity. while Suji moves from OldCity to NearCity, disaster may impact some radio access network equipment of HomeNetwork installed in OldCity. The information regarding the impacted area and the impacted network may be distributed, directly between the networks or indirectly by the authorities. Based on this information, the NeighborNetwork may verify whether a UE of HomeNetwork is located in area where it needs to serve. As the train enters a tunnel in NearCity, the Suji's smartphone temporarily goes out of coverage of HomeNetwork but is located within coverage of NeighborNetwork. It may start to registration procedure to NeighborNetwork. The NeighborNetwork may check whether the HomeNetwork in the NearCity is impacted due to disaster, and if so, additionally it checks information on the time period and the location of the impacted area. Because NearCity is not within impacted area, the NeighborNetwork may refuse to provide any connectivity service to Suji's smartphone. Within a country K, a lot of people move between NearCity and OldCity. Thus, the number of individual access attempt by the subscribers of HomeNetwork may be huge and cause a lot of signaling exchange when each UE crosses boundaries of OldCity which is hit by disaster and NearCity which is not. Thus, NeighborNetwork may broadcast information regarding when and where UEs of other network can access it.

In an example, subject to regulatory requirements or operator's policy, 3GPP system may be able to support a UE of a given PLMN is able to obtain connectivity service (e.g. voice call, mobile data service) from another PLMN only within the area where Disaster Condition is applicable. In an example, subject to regulatory requirements or operator's policy, 3GPP system may be able to support for a PLMN to be aware of the area where it needs to support Disaster Inbound Roaming UEs. In an example, 3GPP system may be able to provide a resource efficient means for a PLMN to indicate potential disaster inbound roaming UE whether they can access it or not.

Figure 12:
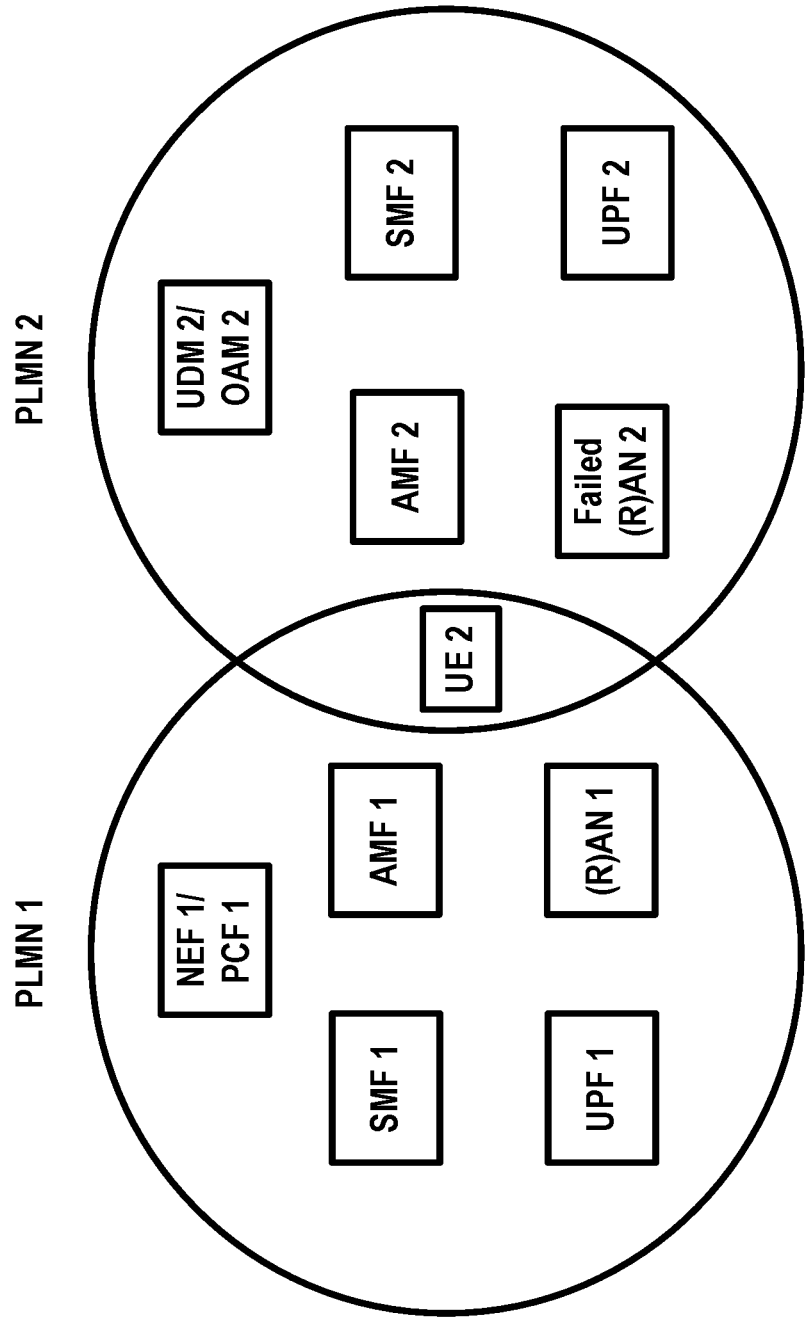
FIG. 12 is an example diagram depicting deployment of PLMN 1 and PLMN 2 as per an aspect of an embodiment of the present invention.
Figure 13:
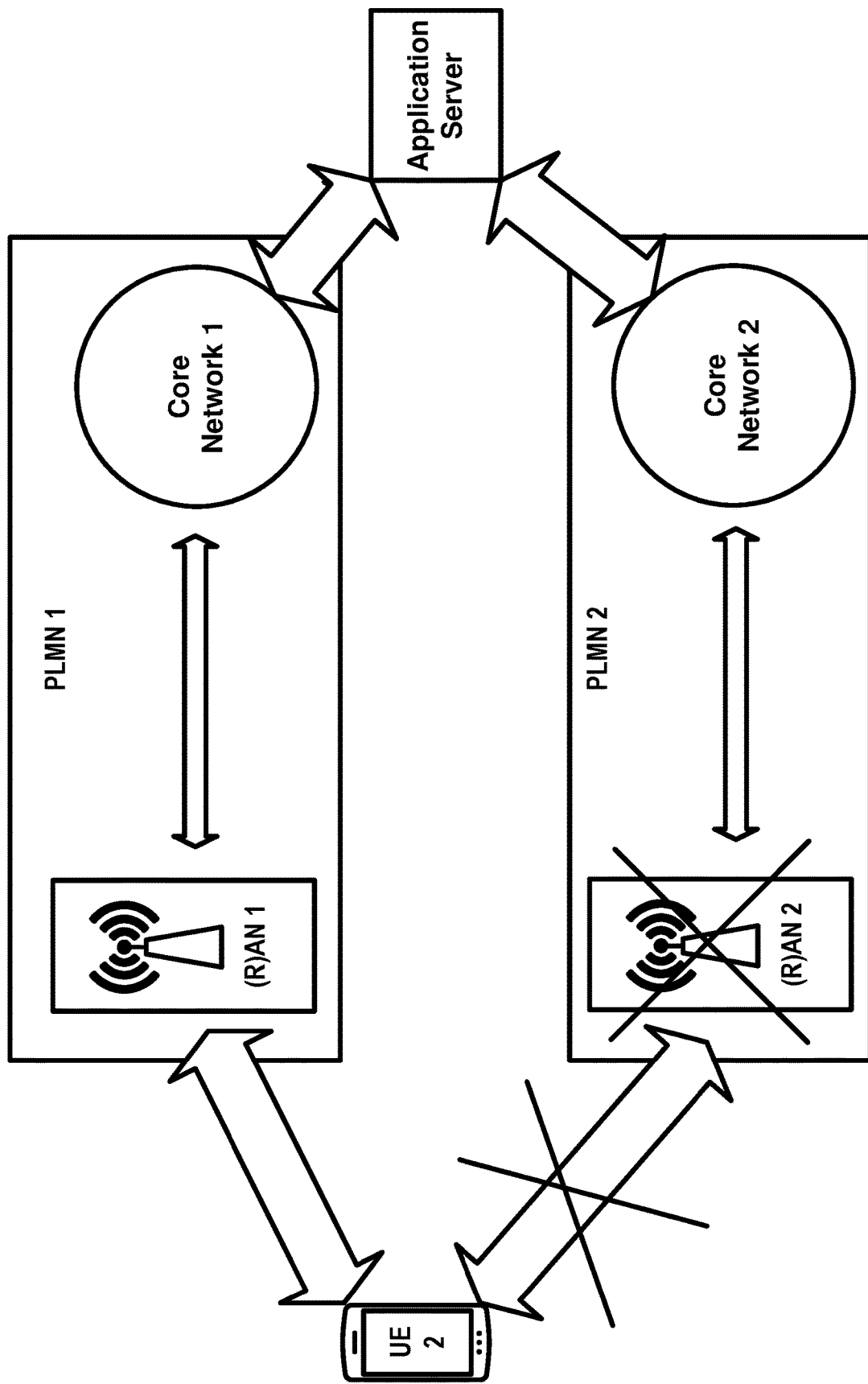
FIG. 13 is an example diagram depicting UE accesses to PLMN 1 when PLMN 2 is in disaster as per an aspect of an embodiment of the present invention.

FIG. 12 is an example diagram depicting deployment of PLMN 1 and PLMN 2. In an example, the PLMN 1 and PLMN 2 may have overlapped coverage, and the PLMN 1 and PLMN2 may be operated by different operators respectively. The PLMN 1 may comprise base station (e.g. (R)AN 1), AMF 1, SMF 1, UPF 1, PCF 1, NEF 1, UDM 1, OAM 1 and/or other network functions. The PLMN 2 may comprise base station (e.g. (R)AN 2), AMF 2, SMF 2, UPF 2, PCF 2, NEF 2, UDM2, OAM 2 and/or other network functions. In an example, a wireless device (e.g. UE 2) may subscribe to the second PLMN. As depicted in FIG. 13, the UE 2 may register to the home PLMN (e.g. PLMN 2) firstly, and access to an application server through the (R)AN 2 and core network (e.g. UPF 2) of the PLMN 2. Due to disaster and other problems, the (R)AN 2 may not be able to provide connectivity to the wireless devices in its coverage, the UE 2 may try to register to the PLMN 1, and access to the application server through PLMN 1.

Existing 5G communication systems (and other similar communication systems) may have issues efficiently supporting network reselection. For example, existing 5G communication systems may not enable a first PLMN to receive status information of a second PLMN and may not enable a wireless device of the second PLMN to access to the first PLMN (e.g. when there is a disaster in the second PLMN). For example, existing 5G communication systems may not enable an NEF and/or a PCF of a first PLMN to receive status information of a second PLMN (e.g. status information of an access network). For example, existing 5G communication systems may not enable an AMF of a first PLMN to receive status information of a second PLMN (e.g. status information of an access network) and to take actions accordingly. For example, existing 5G communication systems may not enable an AMF of a first PLMN to determine allowed service information to a wireless device during a disaster. For example, existing 5G communication systems may not enable a base station to receive disaster information (e.g. disaster information of an area) and to take actions accordingly. For example, existing 5G communication systems may not enable a base station of a first PLMN to receive status information of a second PLMN (e.g. status information of an access network) and to take actions accordingly. For example, existing 5G communication systems may not enable a base station of a PLMN to determine parameters of access control during a disaster and to broadcast parameters of access control to the wireless devices in the coverage.

A neighboring PLMN (e.g., first PLMN) may be a supplementary option for a wireless device to access a communication network when a home PLMN (e.g., second PLMN) of the wireless device is not available, for example, due to a disaster. In existing technologies, a wireless device may have a list of predetermined networks (e.g., allowed PLMN list) that is allowed to access. In existing technologies, a wireless device may have a list of predetermined networks (e.g., not allowed PLMN list) that may not try to access a neighboring network that is not in the list of the predetermined allowed networks. During a disaster, instead of realizing that a home PLMN is not available due to the disaster, a wireless device may determine that the home network, and/or home PLMN is not available. The home network unavailability may be because of a coverage hole. In an implementation of existing technologies, when a neighboring PLMN is configured as a supplementary network during a disaster, a wireless device may not be able to use the neighboring PLMN because the neighboring PLMN is not in a predetermined allowed network list. In an implementation of existing technologies, when a neighboring PLMN is configured as a supplementary network during a disaster, a wireless device may not be able to use the neighboring PLMN because the wireless device may not realize that there is a current disaster situation. Therefore, existing technologies may not effectively serve wireless devices when a disaster occurs.

An example embodiment of the present disclosure provides enhanced mechanisms to implement network reselection. For example, an example embodiment of the present disclosure provides enhanced mechanisms to support a first PLMN to receive status information of a second PLMN and to enable a wireless device of the second PLMN to access to the first PLMN (e.g. when there is a disaster in the second PLMN). An example embodiment of the present disclosure provides enhanced mechanisms to support a NEF and/or a PCF of a first PLMN to receive status information of a second PLMN (e.g. status information of an access network). An example embodiment of the present disclosure provides enhanced mechanisms to support an AMF of a first PLMN to receive status information of a second PLMN and to determine whether to accept a registration from a wireless device of the second PLMN. An example embodiment of the present disclosure provides enhanced mechanisms to support an AMF of a first PLMN to determine allowed service information to a wireless device during a disaster. An example embodiment of the present disclosure provides enhanced mechanisms to support a base station to receive disaster information (e.g. disaster information of an area) and broadcast a disaster PLMN identifier to the wireless devices in the coverage. An example embodiment of the present disclosure provides enhanced mechanisms to support a base station of a first PLMN to receive status information of a second PLMN and to broadcast a disaster PLMN selection information to the wireless devices in the coverage. An example embodiment of the present disclosure provides enhanced mechanisms to support a base station of a PLMN to determine parameters of access control during a disaster and to broadcast parameters of access control to the wireless devices in the coverage.

In an example embodiment, the disaster PLMN may be the PLMN for which one or more network nodes/functions have failed or have become non-responsive due to a disaster, failure, and/or the like.

Figure 14:
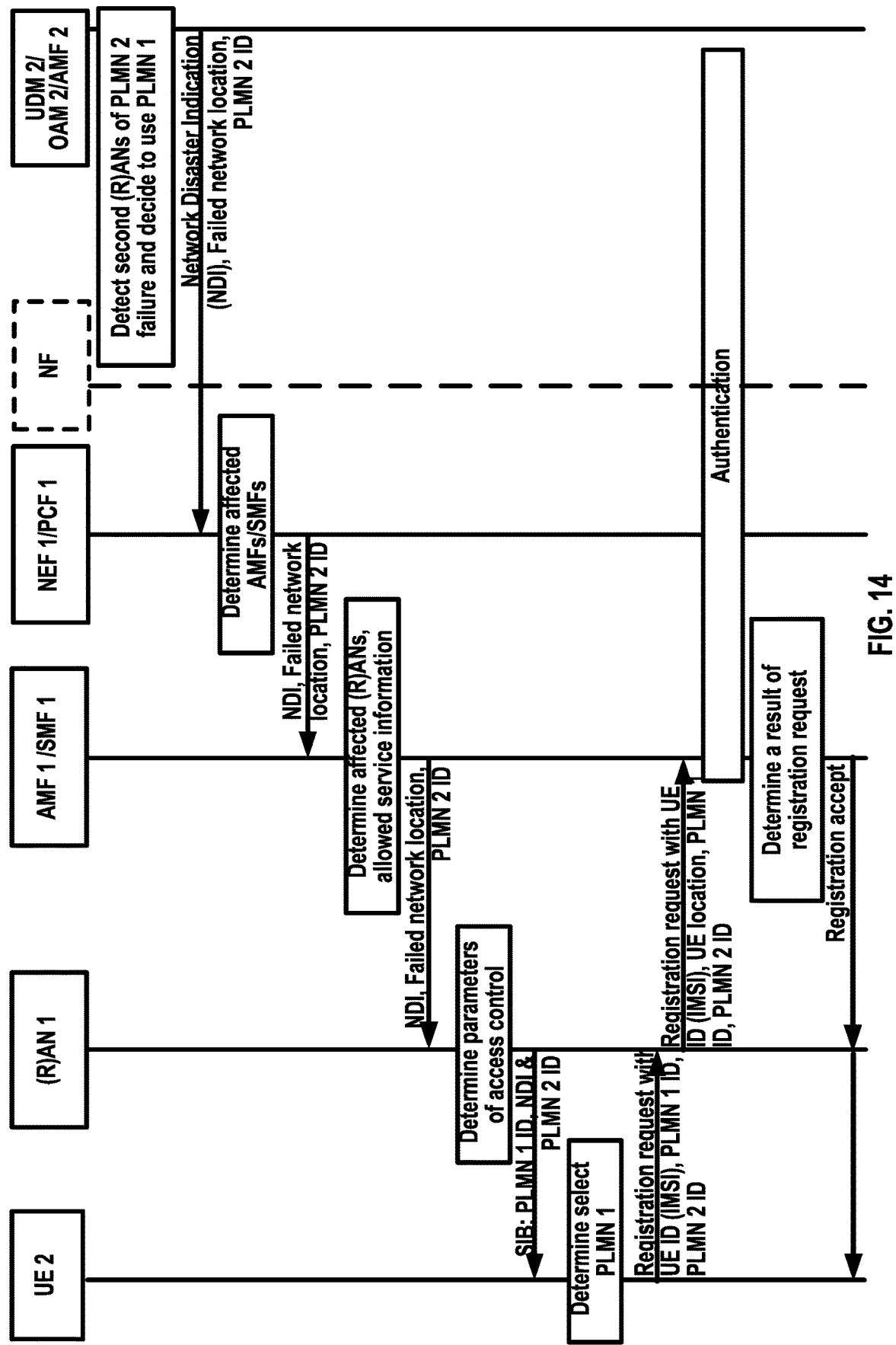
FIG. 14 is an example call flow as per an aspect of an embodiment of the present disclosure.

FIG. 14 shows example call flows which may comprise one or more actions. In an example, a first PLMN (e.g. PLMN 1) and a second PLMN (e.g. PLMN 2) may have overlapped coverages, and the PLMN 1 and PLMN 2 may be operated by different operators (e.g. operator 1 and operator 2) respectively. Wireless devices of the PLMN 2 are not configured to access PLMN 1 when there is no disaster, and the PLMN 1 is not included in a roaming list of the wireless devices of the PLMN 2.

In an example, a second network function of the second PLMN may detect or receive status information of the second PLMN. For example, the second network function may be a UDM (e.g. UDM 2), an OAM (e.g. OAM 2), a NRF, a NWDAF, an AMF (e.g. AMF 2), a PCF and/or the like. The status information of the second PLMN may comprise disaster information and/or load information for at least one first network functions of the second PLMN. For example, the status information may comprise disaster information for an access network of the second PLMN. For example, the status information may comprise overload information for an AMF and/or a (R)AN node of the second PLMN. For example, the status information of the second PLMN may comprise at least one of the following information elements: a network failure/disaster indication, a failed/disaster network location, a network fail/disaster time, a network overload indication, an overloaded network location, a network overload time, an identifier of the at least one first network function (e.g., identifier/FQDN/IP address of (R)AN, identifier/FQDN/IP address of an AMF, and/or the like) of the second PLMN, an identifier of the second PLMN, and/or the like. The network failure/disaster indication may indicate at least one of the first network functions of the second PLMN is in disaster and may not be able to provide service to a wireless device and/or a network. In an example, the second PLMN may be the disaster PLMN. In an example, the identifier of the second PLMN may be the identifier of the disaster PLMN. In an example, the status information of the second PLMN may be the status information of the disaster PLMN. The failed/disaster network location may indicate the location (e.g. a geography location, tracking area, routing area, and/or the like) of the failed/disaster network functions (e.g. at least one of the first network functions). The network fail/disaster time may indicate the time (e.g. NTP time, UTC time and/or the like) of the failed/disaster network functions. In an example, the network fail/disaster time may be used by the first PLMN to determine whether a wireless device of the disaster PLMN is allowed to access to the first PLMN. For example, when the wireless device of the disaster PLMN accesses to the first PLMN, the first PLMN (e.g. (R)AN and/or AMF of the first PLMN) may verify the time of wireless device accessing to the first PLMN is later than the network fail/disaster time. The network overload indication may indicate at least one of the first network functions is overloaded and may not be able to provide service to a wireless device and/or a network. The overloaded network location may indicate the location (e.g. geography location, tracking area, routing area, and/or the like) of the overloaded network functions (e.g. at least one of the first network functions). The network overload time may indicate the time (e.g. NTP time, UTC time and/or the like) of the overloaded network functions.

In response to receiving the status information, the second network function (e.g. OAM 2) of the second PLMN may send a message (e.g., a network status information notification) to a first network function of the first PLMN. The first network function of the first PLMN may be a NEF (e.g. NEF 1), a PCF (e.g. PCF 1), a UDM, an OAM, an AMF, a NRF, a NWDAF, and/or the like. In an example, the second network function of the second PLMN may send the network status information notification message to the first network function of the first PLMN via an interworking function. The interworking function may be a NEF, an AF and/or the like. The network status information notification message may comprise status information of the second PLMN/disaster PLMN, the status information of the second PLMN/disaster PLMN may comprise at least one of the following information elements: a network fail/disaster indication; a failed/disaster network location; a network fail/disaster time; a network overload indication; an overloaded network location, a network overload time; an identifier of the at least one first network function (e.g. identifier/FQDN/IP address of (R)AN, identifier/FQDN/IP address of an AMF) of the second PLMN/disaster PLMN, or an identifier of the second PLMN/disaster PLMN.

In response to the message received from the second network function (e.g. OAM 2) of the second PLMN/disaster PLMN, the first network function of the first PLMN (e.g. NEF 1 or PCF 1) may determine affected/associated one or more SMFs and/or AMFs of the first PLMN based on the status information of the second PLMN/disaster PLMN. For example, the NEF 1/PCF 1 may determine the affected/associated SMFs (e.g. SMF 1) and/or AMFs (e.g. AMF 1) of the first PLMN based on the failed/disaster network location of the second PLMN/disaster PLMN. For example, the coverage of the affected/associated SMFs (e.g. SMF 1) and/or AMFs (e.g. AMF 1) of the first PLMN may comprise the failed/disaster network location of the second PLMN/disaster PLMN. For example, the coverage of the affected/associated SMFs (e.g. SMF 1) and/or AMFs (e.g. AMF 1) of the first PLMN may close to the failed/disaster network location of the second PLMN/disaster PLMN.

For example, the NEF 1/PCF 1 may determine the affected/associated SMFs (e.g. SMF 1) and/or AMFs (e.g. AMF 1) of the first PLMN based on the overloaded network location of the second PLMN. For example, the coverage of the affected/associated SMFs (e.g. SMF 1) and/or AMFs (e.g. AMF 1) of the first PLMN may comprise the overloaded network location of the second PLMN. For example, the coverage of the affected/associated SMFs (e.g. SMF 1) and/or AMFs (e.g. AMF 1) of the first PLMN may close/near to the overloaded network location of the second PLMN.

In an example, the AMF 1 of the first PLMN may receive from the first network function, status information indicating: a failure of a second PLMN providing services to a wireless device in a coverage area in response to a disaster; and an identifier of the second PLMN. In an example, the first network function of the first PLMN (e.g. NEF 1 or PCF 1) may send to affected/associated SMFs (e.g. SMF 1) and/or AMFs (e.g. AMF 1) of the first PLMN a message comprising the status information of the second PLMN/disaster PLMN. For example, the PCF 1 may send to the SMF 1 a Npcf_SMPolicyControl_UpdateNotify request message comprising the status information of the second PLMN/disaster PLMN, and the SMF 1 may send to the AMF 1 a Namf_Communication_N1N2MessageTransfer message comprising the status information of the second PLMN/disaster PLMN. For example, the PCF 1 may send to the AMF 1 a Npcf_UpdateNotify message comprising the status information of the second PLMN/disaster PLMN. For example, the NEF 1 may send to the AMF 1 a status information provision message via the PCF 1 and/or the SMF 1. The status information provision message may comprise the status information of the second PLMN/disaster PLMN. In an example, the status information of the second PLMN/disaster PLMN may comprise at least one of the following information elements: the network fail/disaster indication; the failed/disaster network location; the network fail/disaster time; the network overload indication; the overloaded network location, the network overload time; the identifier of the at least one first network function (e.g. identifier/FQDN/IP address of (R)AN, identifier/FQDN/IP address of an AMF) of the second PLMN/disaster PLMN, or the identifier of the second PLMN/disaster PLMN.

In response to the message received, the AMF 1 may take one or more actions. In an example action, the AMF 1 may determine affected/associated one or more base stations, RAN nodes, and/or the like of the first PLMN based on the status information of the second PLMN/disaster PLMN. For example, the AMF 1 may determine affected/associated one or more base stations (e.g. (R)AN 1) of the first PLMN based on the failed/disaster network location of the second PLMN/disaster PLMN. For example, the coverage of the affected/associated one or more base stations (e.g. (R)AN 1) of the first PLMN may comprise the failed/disaster network location of the second PLMN/disaster PLMN. For example, the coverage of the affected/associated one or more base stations (e.g. (R)AN 1) of the first PLMN may closed to the failed/disaster network location of the second PLMN/disaster PLMN. For example, the AMF 1 may determine affected/associated one or more base stations (e.g. (R)AN 1) based on the overloaded network location of the second PLMN. For example, the coverage of the affected/associated one or more base stations (e.g. (R)AN 1) of the first PLMN may comprise the overloaded network location of the second PLMN. For example, the coverage of the affected/associated one or more base stations (e.g. (R)AN 1) of the first PLMN may closed to the overloaded network location of the second PLMN.

In an example action, based on the status information of the second PLMN/disaster PLMN and/or the resource of the first PLMN and/or the local operator policy, the AMF 1/SMF 1 may determine allowed service information for the second PLMN/disaster PLMN. The allowed service information may comprise at least one of: an allowed service type, an allowed service time duration, an allowed service location area, and/or the like. The allowed service type may indicate at least one service type allowed for wireless device(s) of the second PLMN/disaster PLMN when the wireless device(s) access to the first PLMN in a condition, e.g. in a disaster condition, in an overload condition, and/or the like. The allowed service time duration may indicate time duration (e.g. 30 minutes, 2 hours) allowed for the wireless device(s) of the second PLMN/disaster PLMN when the wireless device(s) access to the first PLMN in a condition, e.g. in a disaster condition, in an overload condition, and/or the like. The allowed service location area may indicate location area allowed for the wireless device(s) of the second PLMN/disaster PLMN when the wireless device(s) access to the first PLMN in a condition, e.g. in a disaster condition, in an overload condition, and/or the like. The location area may be a geographic area. For example, the location area may be a tracking area, a routing area, a cell area, and/or the like. For example, the location area may comprise a geography location and a radius centered on this geography location, and an example geographic location may comprise a longitude and a latitude.

In an example, the AMF 1/SMF 1 may determine an allowed service type based on the status information of the second PLMN/disaster PLMN and/or the resource of the first PLMN and/or the local operator policy. For example, based on the network fail/disaster indication and/or the limited resource of the AMF 1/(R)AN 1 and/or local policy, the AMF 1 may determine "IoT" as an allowed service type. For example, based on the network fail/disaster indication and/or the limited resource of the SMF 1/UPF 1 and/or local policy, the SMF 1 may determine "eMBB" as an allowed service type. In an example, the AMF 1/SMF 1 may determine an allowed service time duration based on the status information of the second PLMN/disaster PLMN and/or the resource of the first PLMN and/or the local operator policy. For example, based on the network fail/disaster indication and/or the network fail/disaster time and/or the resource of the AMF 1/(R)AN 1 and/or local policy, the AMF 1 may determine 2 hours for the allowed service time duration. For example, based on the network fail/disaster indication and/or the network fail/disaster time and/or the resource of the SMF 1/UPF 1 and/or local policy, the SMF 1 may determine 2 hours for the allowed service time duration. In an example, the AMF 1/SMF 1 may determine an allowed service location area based on the status information of the second PLMN/disaster PLMN and/or the resource of the first PLMN and/or the local operator policy. For example, based on the network fail/disaster indication and/or the failed/disaster network location and/or the resource of the AMF 1/(R)AN 1 and/or local policy, the AMF 1 may determine a tracking area for the allowed service location area. For example, based on the network fail/disaster indication and/or the failed/disaster network location and/or the resource of the SMF 1/UPF 1 and/or local policy, the SMF 1 may determine a geographic area for the allowed service location area. In an example, the SMF 1 may send to the AMF 1 a message comprising the determined allowed service information.

A base station of the first PLMN may receive a request indicating an identifier of a second PLMN in response to a failure of the second PLMN providing services to a wireless device. In an example, base stations of the first PLMN may receive a request indicating: a failure of a second PLMN providing services to a wireless device in a coverage area in response to a disaster; and an identifier of the second PLMN. In an example, the AMF 1 may send to the affected/associated one or more base stations (e.g. (R)AN 1) a message, the message may comprise the status information of the second PLMN/disaster PLMN and/or the allowed service information for the second PLMN/disaster PLMN. For example, the AMF 1 may send to the (R)AN 1 a configuration message comprising at least one of: the network fail/disaster indication; the failed/disaster network location; the network fail/disaster time; the network overload indication; the overloaded network location, the network overload time; the identifier of the at least one first network function (e.g. identifier/FQDN/IP address of (R)AN, identifier/FQDN/IP address of an AMF) of the second PLMN/disaster PLMN, the identifier of the second PLMN/disaster PLMN, an allowed service type; an allowed service time duration; or an allowed service location area.

For example, the AMF 1 may send to the (R)AN 1 a configuration message comprising at least one of: the network fail/disaster indication, the failed/disaster network location, the identifier of (R)AN of the second PLMN/disaster PLMN, the identifier of the second PLMN/disaster PLMN, the allowed service type indicating "eMBB" service may be used by a wireless device of the second PLMN/disaster PLMN, the allowed service time duration indicating a wireless device of the second PLMN/disaster PLMN may access the first PLMN for 24 hours, or the allowed service location area indicating a wireless device of the second PLMN/disaster PLMN may access the first PLMN in a tracking area. In an example, based on the information elements of the configuration message, the (R)AN 1 may determine available resource for the wireless devices in the coverage, wherein the wireless devices may be the wireless devices of the first PLMN and/or the wireless devices of the second PLMN.

For example, the AMF 1 may send to the (R)AN 1 a configuration message to indicate one or more tracking areas supporting the second PLMN/disaster PLMN, e.g. supporting a wireless device of the second PLMN/disaster PLMN accessing to the one or more tracking areas of the first PLMN. For example, the AMF 1 may send to the (R)AN 1 a configuration message to indicate one or more cells supporting the second PLMN/disaster PLMN, e.g. supporting a wireless device of the second PLMN/disaster PLMN accessing to the one or more cells of the first PLMN. For example, the AMF 1 may send to the (R)AN 1 a configuration message to indicate a wireless device of the second PLMN/disaster PLMN may access the PLMN 1 in a geographic area for 2 hours, e.g. considering the resource condition of the PLMN 1.

In response to the message received from the AMF 1, the base stations of the first PLMN (e.g. (R)AN 1) may take one or more actions. In an example action, based on the configuration message (e.g. the status information of the second PLMN/disaster PLMN and/or the allowed service information for the second PLMN/disaster PLMN), the (R)AN may determine limited services to the wireless device (e.g. no eMBB service is permitted during the disaster). For example, based on the configuration message (e.g. the status information of the second PLMN/disaster PLMN and/or the allowed service information for the second PLMN/disaster PLMN), and/or based on the resource of the (R)AN 1, and/or in order to avoid overload and/or congestion during the disaster, the (R)AN 1 may determine parameters of access control, where the parameters of access control may comprise cell barring (e.g. AC Barring for MO Data), access class barring (e.g. access class 12 is barred), and/or service specific access control barring (e.g. video over LTE is barred). In an example action, the (R)AN 1 may transmit the identifier of the second PLMN/disaster PLMN. In an example, the base station of the first PLMN may transmit the identifier of the second PLMN/disaster PLMN in the coverage area. For example, the base station of the first PLMN may transmit a SIB and/or a MIB message to one or more wireless devices in the coverage area. The one or more wireless devices may be wireless devices of the first PLMN. The one or more wireless devices may be wireless devices of the second PLMN/disaster PLMN. In an example, the SIB and/or MIB message may comprise at least one of: the network fail/disaster indication, the identifier of the second PLMN, and/or the identifier of the disaster PLMN, the allowed service type (e.g. eMBB), the allowed service location area (e.g. a tracking area), the allowed service time duration (e.g. 24 hours), the parameters of access control, or the identifier of the first PLMN/serving PLMN.

In response to the SIB and/or MIB message received from the base stations of the first PLMN/serving PLMN (e.g. (R)AN 1), the wireless devices (e.g. UE 2) of the second PLMN/disaster PLMN may take one or more actions. In an example embodiment, based on the SIB and/or MIB message received from the (R)AN 1, the UE 2 may determine a serving PLMN (e.g. PLMN 1) during the disaster. For example, the UE 2 may determine the serving PLMN based on the network fail/disaster indication, the identifier of the disaster PLMN and/or the identifier of the serving PLMN. In an example action, based on the SIB and/or MIB message received from the (R)AN 1, the UE 2 may determine a registration request message. For example, the UE 2 may determine the registration request message based on the network fail/disaster indication, the identifier of the disaster PLMN, the allowed service type, the allowed service location area, the allowed service time duration, and/or the identifier of the serving PLMN.

In an example embodiment, the UE 2 may send an message to the (R)AN 1. The AN message may comprise AN parameters and/or a registration request message. The AN parameters may include at least one of: an UE identity (e.g. 5G-S-TMSI/GUAMI/IMSI), a selected PLMN ID (e.g. the identifier of the serving PLMN/PLMN 1), a disaster PLMN indication, the identifier of the disaster PLMN, requested NSSAI, and/or establishment cause. The establishment cause may indicate requesting establishment of an RRC connection to the serving PLMN (e.g. PLMN 1) during the disaster of home PLMN (e.g. PLMN 2). The registration request message may comprise at least one of: registration type, UE identity (e.g. SUCI/5G-GUTI/PEI), selected PLMN ID (e.g. the identifier of the serving PLMN/PLMN 1), a disaster PLMN indication, the identifier of the disaster PLMN, last visited TAI (if available), security parameters, requested NSSAI, UE Radio Capability Update, UE MM Core Network Capability, PDU Session status, or List Of PDU Sessions To Be Activated). The disaster PLMN indication may indicate that the UE selects the first PLMN/ serving PLMN during the disaster of the second PLMN/ disaster PLMN.

In response to the AN message received, the (R)AN 1 may select an AMF (e.g. AMF 1) based on the AN message. For example, the (R)AN 1 may select an AMF based on the selected PLMN ID and/or the disaster PLMN indication and/or the identifier of the disaster PLMN and/or the establishment cause. The (R)AN 1 may send to the AMF 1 a N2 message comprising N2 parameters, the registration request message and/or UE policy container. The N2 parameters may comprise at least one of: the selected PLMN ID, location information and cell identity related to the cell in which the UE is camping, UE context request which may indicate that a UE context including security information needs to be setup at the (R)AN 1, and/or the establishment cause.

In response to the N2 message received from the (R)AN 1, the AMF 1 make take one or more actions. In an example action, the AMF 1 may perform authentication for the UE 2. In an example action, based on the received registration request message and/or the message received from the SMF 1/NEF 1/PCF 1 and/or the result of the authentication, the AMF 1 may determine a result of the registration request message. For example, based on the selected PLMN ID and/or the disaster PLMN indication and/or the identifier of the disaster PLMN and/or the establishment cause and/or the location information of UE 2 and/or the status information of the second PLMN/disaster PLMN and/or the result of the authentication (e.g. success), the AMF 1 may determine the result of the registration request message (e.g. accept the registration). In an example action, the AMF 1 may send to the UE 2 via (R)AN 1 a registration accept message comprising at least one of: the allowed service type, the allowed service location area, the allowed service time duration, and/or the identifier of the serving PLMN.

In response to the registration accept message received from the AMF 1, the UE 2 may determine service type and/or service time duration and/or service location area based on the allowed service type, the allowed service location area, the allowed service time duration, and/or the identifier of the serving PLMN received from the AMF 1.

Figure 15:
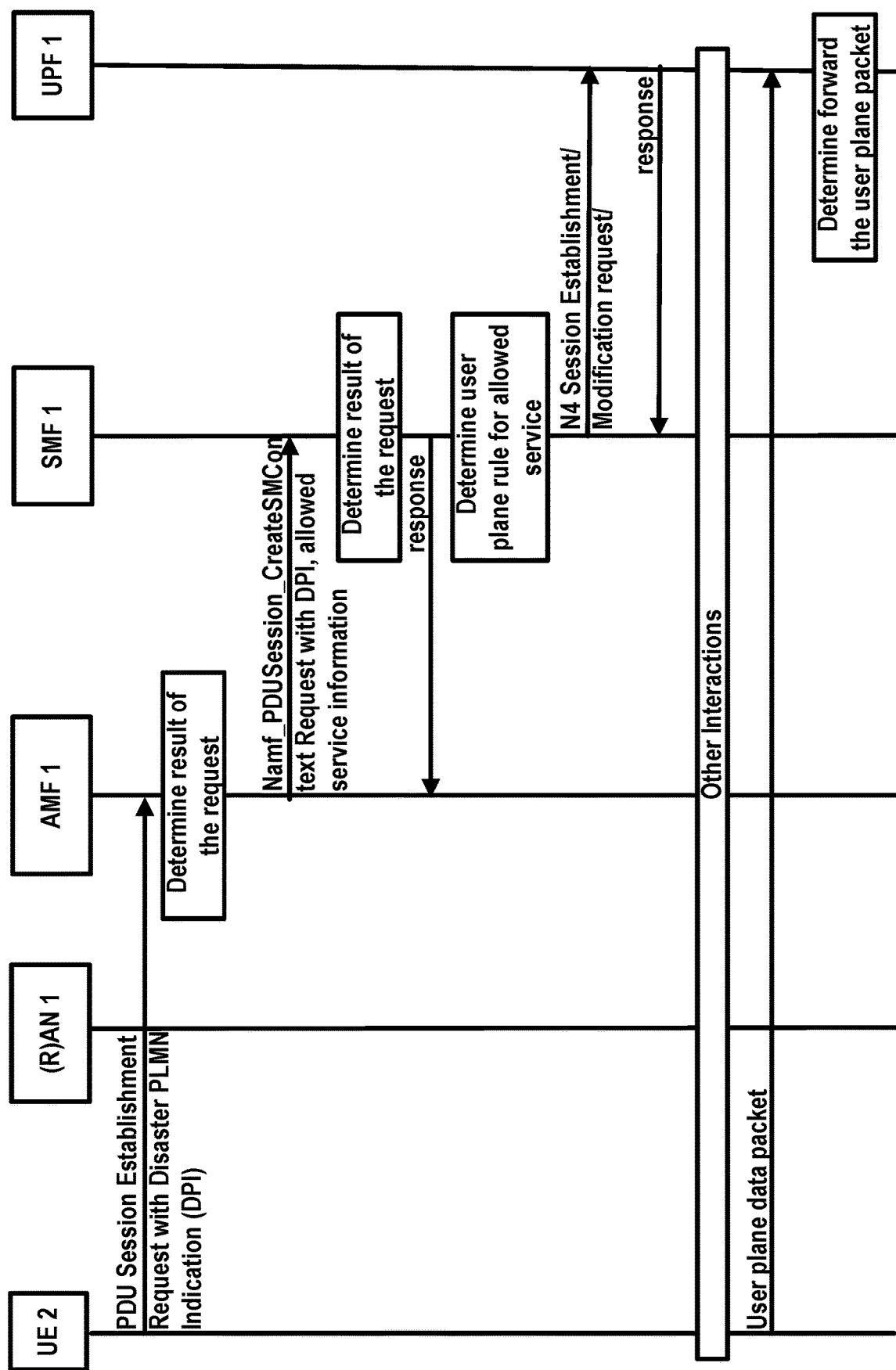
FIG. 15 is an example call flow as per an aspect of an embodiment of the present disclosure.

FIG. 15 shows example call flows which may comprise one or more actions. The AMF 1 may receive from the UE 2 via the (R)AN 1 a PDU session establishment request message requesting establishment of a PDU session. The PDU session establishment request message may comprise at least one of: the disaster PLMN indication, requested service type, and/or the location information of UE 2. The AMF 1 may determine a result of the PDU session establishment request message based on the information elements of the PDU session establishment request message and/or the status information of the second PLMN/disaster PLMN and/or the allowed service information (e.g. the allowed service type, the allowed service location area, the allowed service time duration) for the second PLMN/disaster PLMN. For example, the AMF 1 may verify whether the UE 2 (current) location is in the coverage of the allowed service location area. For example, the AMF 1 may verify whether the requested service type is aligned with the allowed service type. For example, the AMF 1 may reject the PDU session establishment request message to the UE 2 if the verification is failure. For example, the AMF 1 may accept the PDU session establishment request message, and the AMF 1 may send to the SMF 1 a message (e.g. Namf_P-DUSession_CreateSMContext Request) comprising at least one of: the disaster PLMN indication, requested service type, the location information of UE 2, and/or the allowed service information.

In response to the message received from the AMF 1, the SMF 1 may take one or more actions. In an example action, the SMF 1 may determine a result of the Namf_PDUSession_CreateSMContext Request message based on the information elements of the Namf_PDUSession_CreateSMContext Request and/or the status information of the second PLMN/disaster PLMN and/or the allowed service information (e.g. the allowed service type, the allowed service location area, the allowed service time duration) for the second PLMN/disaster PLMN. For example, the SMF 1 may verify whether the requested service type align with the allowed service type and determine the result (e.g. accept) of the PDU session establishment request. The SMF 1 may send to the UE 2 a response message (e.g. PDU session establishment response) comprising the result of the request. In an example action, based on the information elements of the Namf_PDUSession_CreateSMContext Request and/or the status information of the second PLMN/disaster PLMN and/or the allowed service information, the SMF 1 may determine at least one user plane rule for allowed service of UE 2 during the disaster. The at least one user plane rule may comprise the allowed service information (e.g. allowed service type, allowed service time) for UE 2. The SMF 1 may send to the UPF 1 a message (e.g. N4 session establishment/modification request) comprising the at least one user plane rule. There may be other actions between UE 2, (R)AN 1, AMF 1, SMF 1 and UPF 1 to complete the procedure of the PDU session establishment. In an example, after the PDU session has been established, the UE 2 may send a user plane packet to an application server via the UPF 1, the UPF 1 may enforce the at least one user plane rule by verifying whether the service type of the user plane packet is aligned with the allowed service type, and the UPF 1 may take action accordingly (e.g. forward the user plane packet, discard the user plane packet).

Figure 16:
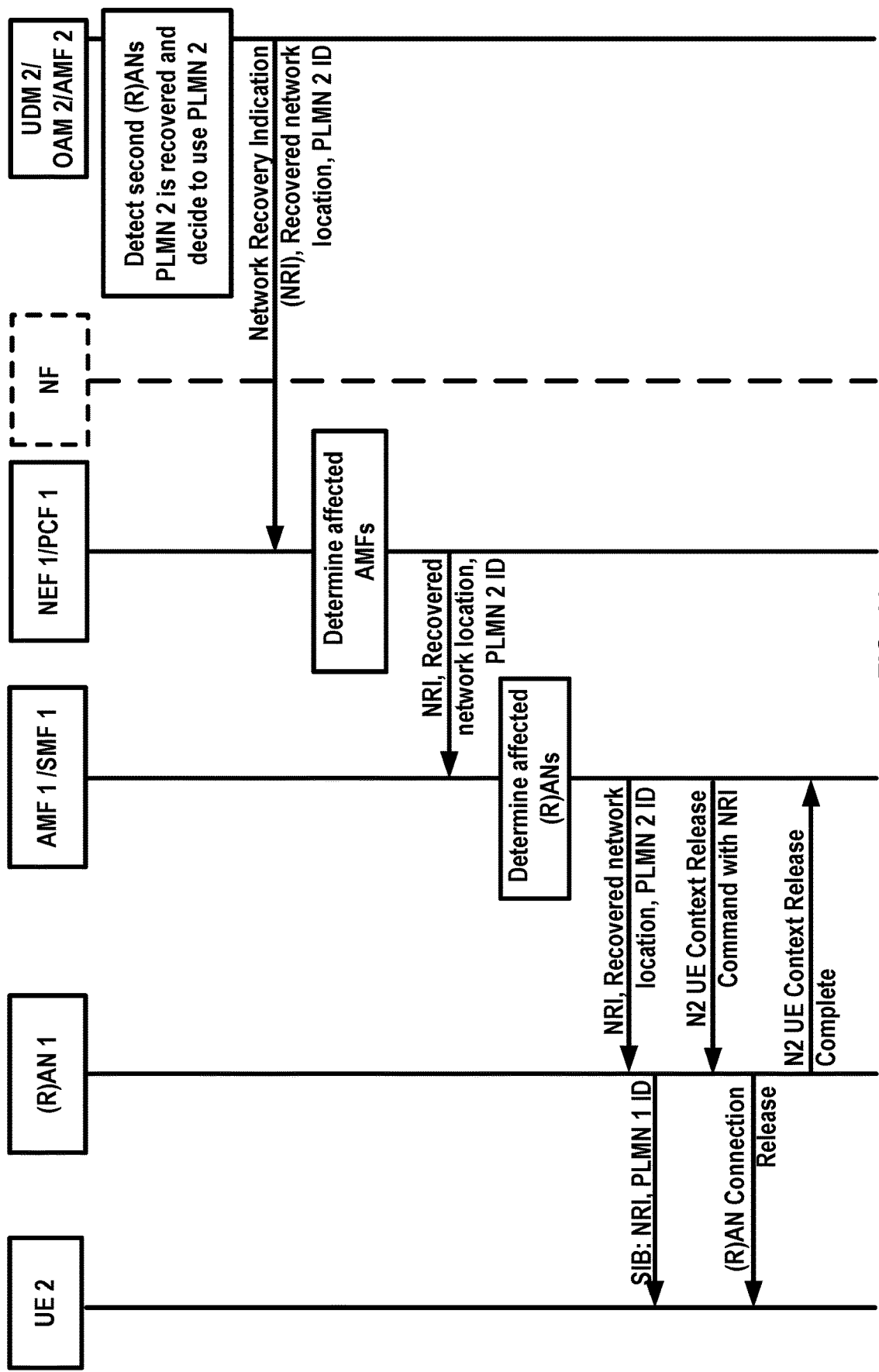
FIG. 16 is an example call flow as per an aspect of an embodiment of the present disclosure.

In an example, after the PDU session has been established, the AMF 1/SMF 1 may control/guarantee the UE 2 accesses the allowed service type in the allowed service location area and/or within the allowed service time duration. For example, when the UE 2 accesses a service that does not belong to the allowed service type and/or the UE 2 accesses the network for more than the allowed service time duration and/or the UE 2 moves out of the allowed service location area, the AMF 1/SMF 1 may stop the UE 2 service (e.g. terminate the PDU session). FIG. 16 shows example call flows which may comprise one or more actions. In an example, the second network function (e.g. OAM 2, UDM 2, AMF 2) of the second PLMN may detect or receive status information of the second PLMN. The status information of the second PLMN may comprise disaster recovery information and/or load information for at least one first network functions of the second PLMN. For example, the status information may comprise disaster recovery information for an access network of the second PLMN. For example, the status information may comprise overload recovery information for an AMF and/or (R)AN of the second PLMN. For example, the status information of the second PLMN may comprise at least one of the following information elements: a network recovery indication; a recovered network location; a network recovery time; a network overload recovery indication; a recovered overload network location, a network overload recovery time; an identifier of the at least one first network function (e.g. identifier/FQDN/IP address of (R)AN, identifier/FQDN/IP address of an AMF) of the second PLMN, or an identifier of the second PLMN. The network recovery indication may indicate at least one of the first network functions of the second PLMN is recovered from the disaster and may be able to provide service to a wireless device and/or a network. The recovered network location may indicate the location (e.g. geography location, tracking area, routing area, and/or the like) of the recovered network functions (e.g. at least one of the first network functions). The network recovery time may indicate the time (e.g. NTP time, UTC time and/or the like) of the failed/disaster network functions has been recovered. The network overload recovery indication may indicate at least one of the first network functions is recovered from the overload and may be able to provide service to a wireless device and/or a network. The recovered overload network location may indicate the location (e.g. geography location, tracking area, routing area, and/or the like) of the recovered overload network functions (e.g. at least one of the first network functions). The network overload recovery time may indicate the time (e.g. NTP time, UTC time and/or the like) of the overloaded network functions has been recovered.

In response to receiving the status information, the second network function of the second PLMN (e.g. OAM 2) may send a message (e.g. network status information notification) to the first network function of the first PLMN (e.g. NEF 1/PCF 1). In an example, the second network function of the second PLMN may send the network status information notification message to the first network function of the first PLMN via an interworking function. The network status information notification message may comprise status information of the second PLMN/disaster PLMN, the status information of the second PLMN/disaster PLMN may comprise at least one of the following information elements: the network recovery indication; the recovered network location; the network recovery time; the network overload recovery indication; the recovered overload network location, the network overload recovery time; the identifier of the at least one first network function (e.g. identifier/FQDN/IP address of (R)AN, identifier/FQDN/IP address of an AMF) of the second PLMN, or the identifier of the second PLMN.

In response to the message received from the OAM 2 of the recovered disaster PLMN (e.g. second PLMN), the NEF 1/PCF 1 may determine affected/associated one or more SMFs and/or AMFs of the first PLMN based on the status information of the second PLMN/recovered disaster PLMN. For example, the NEF 1/PCF 1 may determine the affected/associated SMFs (e.g. SMF 1) and/or AMFs (e.g. AMF 1) of the first PLMN based on the recovered network location of the second PLMN/recovered disaster PLMN. For example, the coverage of the affected/associated SMFs (e.g. SMF 1) and/or AMFs (e.g. AMF 1) of the first PLMN may comprise the recovered network location of the second PLMN/recovered disaster PLMN. For example, the coverage of the affected/associated SMFs (e.g. SMF 1) and/or AMFs (e.g. AMF 1) of the first PLMN may close to the recovered network location of the second PLMN/recovered disaster PLMN.

For example, the NEF 1/PCF 1 may determine the affected/associated SMFs (e.g. SMF 1) and/or AMFs (e.g. AMF 1) of the first PLMN based on the recovered overload network location of the second PLMN. For example, the coverage of the affected/associated SMFs (e.g. SMF 1) and/or AMFs (e.g. AMF 1) of the first PLMN may comprise the recovered overload network location of the second PLMN. For example, the coverage of the affected/associated SMFs (e.g. SMF 1) and/or AMFs (e.g. AMF 1) of the first PLMN may close/near to the recovered overload network location of the second PLMN.

In an example, the AMF 1 of the first PLMN may receive from the first network function, status information indicating: a recovery of a second PLMN providing services to a wireless device in a coverage area in response to a recovery; and an identifier of the second PLMN. In an example, the first network function of the first PLMN (e.g. NEF 1 or PCF 1) may send to affected/associated SMFs (e.g. SMF 1) and/or AMFs (e.g. AMF 1) of the first PLMN a message comprising the status information of the second PLMN/recovered disaster PLMN. For example, the PCF 1 may send to the SMF 1 a Npcf_SMPolicyControl_UpdateNotify request message comprising the status information of the second PLMN/recovered disaster PLMN, and the SMF 1 may send to the AMF 1 a Namf_Communication_N1N2MessageTransfer message comprising the status information of the second PLMN/recovered disaster PLMN. For example, the PCF 1 may send to the AMF 1 a Npcf_UpdateNotify message comprising the status information of the second PLMN/recovered disaster PLMN. For example, the NEF 1 may send to the AMF 1 a status information provision message via the PCF 1 and/or the SMF 1. The status information provision message may comprise the status information of the second PLMN/recovered disaster PLMN. In an example, the status information of the second PLMN/recovered disaster PLMN may comprise at least one of the following information elements: the network recovery indication; the recovered network location; the network recovery time; the network overload recovery indication; the recovered overload network location, the network overload recovery time; the identifier of the at least one first network function (e.g. identifier/FQDN/IP address of (R)AN, identifier/FQDN/IP address of an AMF) of the second PLMN, or the identifier of the second PLMN.

In response to the message received, the AMF 1 may take one or more actions. In an example action, the AMF 1 may determine affected/associated one or more base stations of the first PLMN based on the status information of the second PLMN/recovered disaster PLMN. For example, the AMF 1 may determine affected/associated one or more base stations (e.g. (R)AN 1) of the first PLMN based on the recovered network location of the second PLMN/recovered disaster PLMN. For example, the coverage of the affected/associated one or more base stations (e.g. (R)AN 1) of the first PLMN may comprise the recovered network location of the second PLMN/recovered disaster PLMN. For example, the coverage of the affected/associated one or more base stations (e.g. (R)AN 1) of the first PLMN may closed to the recovered network location of the second PLMN/recovered disaster PLMN. For example, the AMF 1 may determine affected/associated one or more base stations (e.g. (R)AN 1) based on the recovered overloaded network location of the second PLMN. For example, the coverage of the affected/associated one or more base stations (e.g. (R)AN 1) of the first PLMN may comprise the recovered overloaded network location of the second PLMN. For example, the coverage of the affected/associated one or more base stations (e.g. (R)AN 1) of the first PLMN may closed to the recovered overloaded network location of the second PLMN.

In an example action, the AMF 1 may send to the affected/associated one or more base stations (e.g. (R)AN 1)

a message, the message may comprise the status information of the second PLMN/recovered disaster PLMN. For example, the AMF 1 may send to the (R)AN 1 a configuration message comprising at least one of: the network recovery indication; the recovered network location; the network recovery time; the network overload recovery indication; the recovered overload network location, the network overload recovery time; the identifier of the at least one first network function (e.g. identifier/FQDN/IP address of (R)AN, identifier/FQDN/IP address of an AMF) of the second PLMN, or the identifier of the second PLMN/recovered disaster PLMN.

In response to the configuration message received from the AMF 1, the base stations of the first PLMN (e.g. (R)AN 1) may transmit the identifier of the first PLMN. In an example, the base station of the first PLMN may transmit the identifier of the first PLMN in the coverage area. For example, the base station of the first PLMN may transmit a SIB and/or a MIB message to one or more wireless devices in the coverage area. The one or more wireless devices may be wireless devices of the first PLMN. The one or more wireless devices may be wireless devices of the second PLMN/recovered disaster PLMN. In an example, the SIB and/or MIB message may comprise at least one of: a network recovery indication, an identifier of the second PLMN/recovered disaster PLMN, or an identifier of the first PLMN/serving PLMN.

Figure 18:
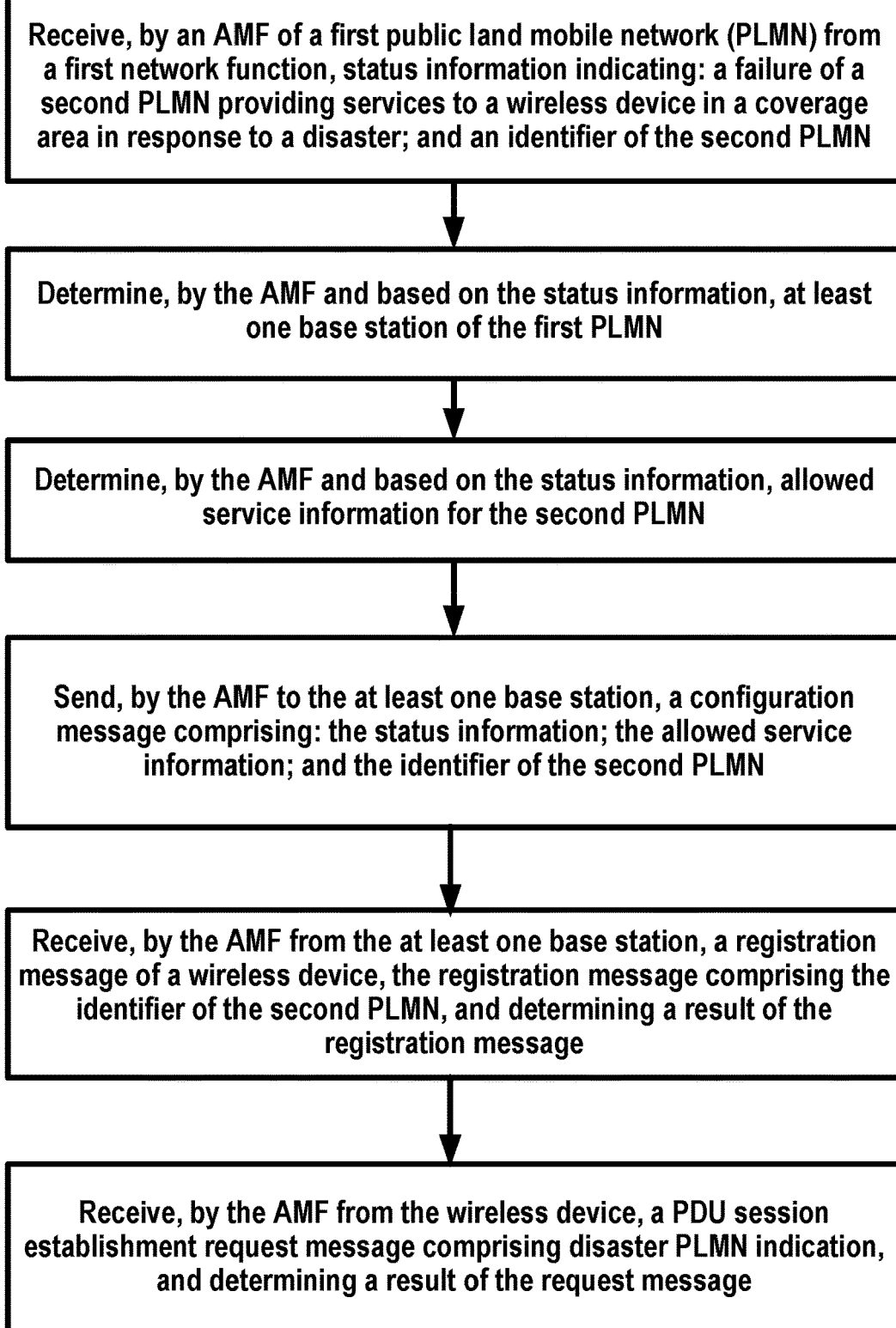
FIG. 18 is an example diagram depicting the procedures of AMF as per an aspect of an embodiment of the present disclosure.

In an example action, based on the status information of the second PLMN/recovered disaster PLMN and/or the local operator policy, the AMF 1 may determine recalling resource allocated to the second PLMN/recovered disaster PLMN. For example, the AMF 1 may send to the (R)AN 1 an N2 UE context release command (cause) to release UE context/UE-associated logical NG-connection. The N2 UE context release command may comprise the network recovery indication and/or the identifier of the second PLMN/recovered disaster PLMN. For example, the cause value of the N2 UE context release command may comprise the network recovery indication. In response to the message received from the AMF 1, the (R)AN 1 may request the UE 2 to release (R)AN connection (e.g. RRC connection). Upon receiving (R)AN connection release confirmation from the UE, the (R)AN may delete the context of UE 2. In an example action, based on the status information of the second PLMN/recovered disaster PLMN and/or the local operator policy, the AMF 1 may determine to reject a wireless device of the second PLMN/recovered disaster PLMN to access to the first PLMN. FIG. 17 is an example diagram depicting the procedures of (R)AN as per an aspect of an embodiment of the present disclosure. FIG. 18 is an example diagram depicting the procedures of AMF as per an aspect of an embodiment of the present disclosure.

Figure 19:
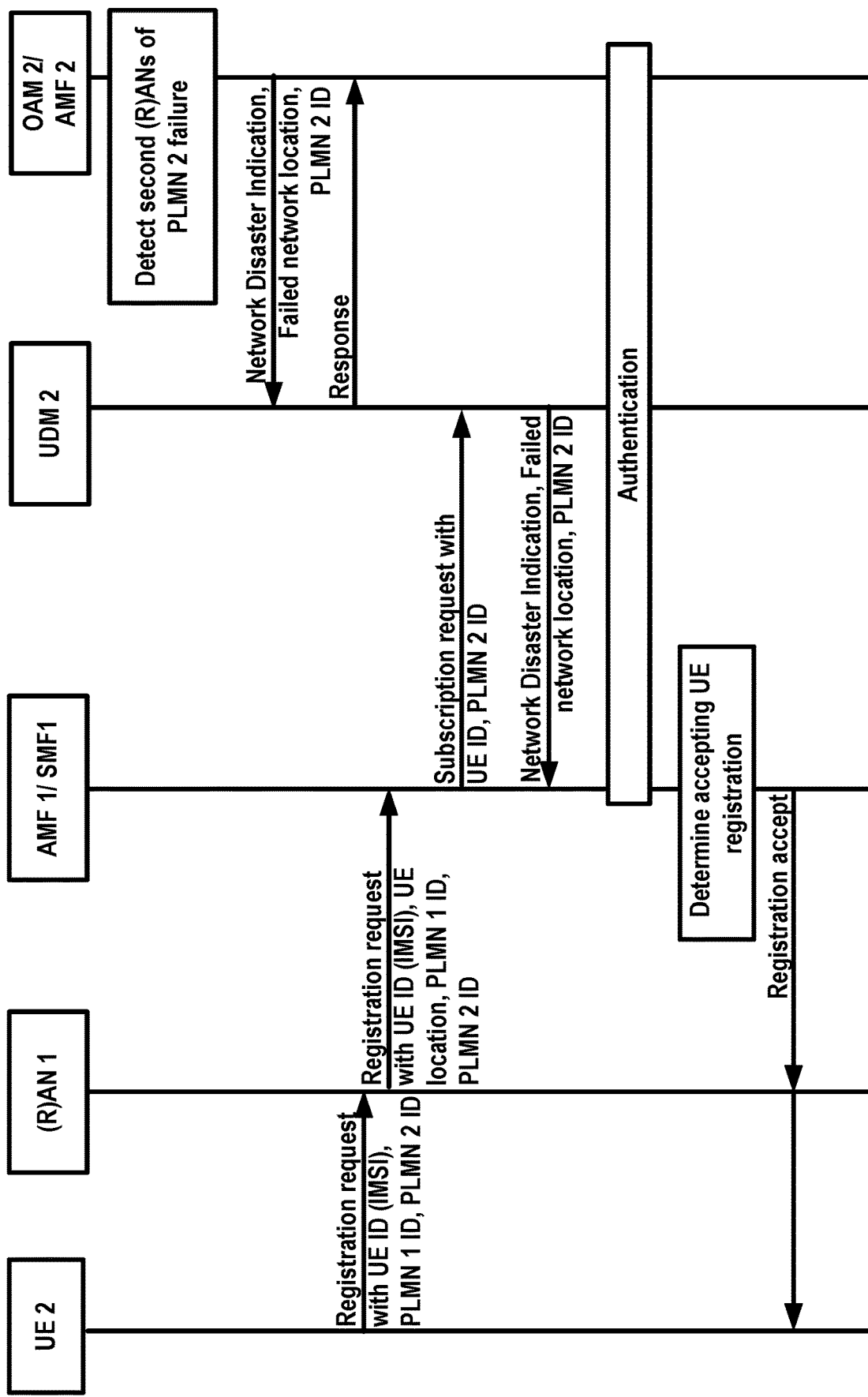
FIG. 19 is an example call flow as per an aspect of an embodiment of the present disclosure.

FIG. 19 is an example call flow which may comprise one or more actions. In an example, a second network function of the second PLMN (e.g. PLMN 2) may detect or receive status information of the second PLMN. For example, the second network function may be an OAM (e.g. OAM 2), an AMF (e.g. AMF 2), a UDM, a NRF, a NWDAF, a PCF and/or the like. The status information of the second PLMN may comprise disaster information and/or load information for at least one first network functions of the second PLMN. For example, the status information may comprise disaster information for an access network of the second PLMN. For example, the status information may comprise overload information for an AMF (e.g. AMF 2) and/or (R)AN of the second PLMN. For example, the status information of the second PLMN may comprise at least one of the following information elements: a network fail/disaster indication; a failed/disaster network location; a network fail/disaster time; a network overload indication; an overloaded network location, a network overload time; an identifier of the at least one first network function (e.g. identifier/FQDN/IP address of (R)AN, identifier/FQDN/IP address of an AMF) of the second PLMN, or an identifier of the second PLMN. The network fail/disaster indication may indicate at least one of the first network functions of the second PLMN is in disaster and may not be able to provide service to a wireless device and/or a network. The failed/disaster network location may indicate the location (e.g. geography location, tracking area, routing area, and/or the like) of the failed/disaster network functions (e.g. at least one of the first network functions). The network fail/disaster time may indicate the time (e.g. NTP time, UTC time and/or the like) of the failed/disaster network functions. The network overload indication may indicate at least one of the first network functions is overloaded and may not be able to provide service to a wireless device and/or a network. The overloaded network location may indicate the location (e.g. geography location, tracking area, routing area, and/or the like) of the overloaded network functions (e.g. at least one of the first network functions). The network overload time may indicate the time (e.g. NTP time, UTC time and/or the like) of the overloaded network functions.

In response to receiving the status information, the second network function of the second PLMN (e.g. AMF 2) may send a message (e.g. network status information notification) to a third network function of the second PLMN. The third network function of the second PLMN may be a UDM (e.g. UDM 2), a NEF, a PCF, an OAM, a NRF, a NWDAF, and/or the like. For example, the second network function AMF 2 may send to the third network function UDM 2 the network status information notification message. The network status information notification message may comprise status information of the second PLMN/disaster PLMN, the status information of the second PLMN/disaster PLMN may comprise at least one of the following information elements: a network fail/disaster indication; a failed/disaster network location; a network fail/disaster time; a network overload indication; an overloaded network location, a network overload time; an identifier of the at least one first network function (e.g. identifier/FQDN/IP address of (R)AN, identifier/FQDN/IP address of an AMF) of the second PLMN/disaster PLMN, or an identifier of the second PLMN/disaster PLMN. In response to the message received from the AMF 2, UDM 2 may send to the AMF 2 a response message (e.g. network status information notification response).

In an example, a wireless device (e.g. UE 2) of the second PLMN (e.g. PLMN 2). may send an message to a base station (e.g. (R)AN 1) of a first PLMN (e.g. PLMN 1). For example, the UE 2 may not be able to access to the second PLMN when access network of the second PLMN is in disaster, and the UE 2 may select and access to the first PLMN. The AN message may comprise AN parameters and/or a registration request message. The AN parameters may include at least one of: an UE identity (e.g. 5G-S-TMSI/GUAMI/IMSI), a selected PLMN ID (e.g. the identifier of the serving PLMN/PLMN 1), an identifier of the second PLMN/disaster PLMN, requested NSSAI, and/or establishment cause. The establishment cause may indicate requesting establishment of an RRC connection to the serving PLMN (e.g. PLMN 1) during the disaster of home PLMN (e.g. the second PLMN/disaster PLMN, PLMN 2). The registration request message may comprise at least one of:

registration type, UE identity (e.g. SUCI/5G-GUTI/PEI), selected PLMN ID (e.g. the identifier of the serving PLMN/PLMN 1), the identifier of the second PLMN/disaster PLMN, last visited TAI (if available), security parameters, requested NSSAI, UE Radio Capability Update, UE MM Core Network Capability, PDU Session status, or List Of PDU Sessions To Be Activated).

In response to the AN message received, the (R)AN 1 may select an AMF (e.g. AMF 1) of the first PLMN and send to the AMF 1 a N2 message. The N2 message may comprise N2 parameters, the registration request message and/or UE policy container. The N2 parameters may comprise at least one of: the selected PLMN ID, location information and cell identity related to the cell in which the UE is camping, UE context request which may indicate that a UE context including security information needs to be setup at the (R)AN 1, and/or the establishment cause.

In response to the message received from the (R)AN 1, the AMF 1 make take one or more actions. In an example action, the AMF 1 may send to the UDM 2 of the second PLMN a message (e.g. subscription request) requesting the subscription information of UE 2. The subscription request message may comprise at least one of: the UE identity, selected PLMN ID (e.g. the identifier of the serving PLMN/PLMN 1), and/or the identifier of the home PLMN/second PLMN/disaster PLMN. In response to the message received from the AMF 1, the UDM 2 may take one or more actions. In an example action, based on the status information of the second PLMN/disaster PLMN and/or local operator policy and/or agreement between operators (e.g. SLA, roaming agreement), the UDM 2 may determine whether the UE 2 is permitted to access to the PLMN 1 during the disaster of PLMN 2. For example, the UDM 2 may determine that UE 2 is permitted to access to the PLMN 1 during the disaster of PLMN 2. In an example action, the UDM 2 may send to the (R)AN 1 a response message (e.g. subscription response) comprising at least one of: the network fail/disaster indication; the failed/disaster network location; the network fail/disaster time; the network overload indication; the overloaded network location, the network overload time; the identifier of the at least one first network function (e.g. identifier/FQDN/IP address of (R)AN, identifier/FQDN/IP address of an AMF) of the second PLMN, or the identifier of the second PLMN.

In response to the message received from the UDM 2, the AMF 1 may take one or more actions. In an example action, the AMF 1 may perform authentication for the UE 2. In an example action, based on the received registration request message and/or the subscription information received from the UDM 2 and/or the result of the authentication, the AMF 1 may determine a result of the registration request message. For example, based on the selected PLMN ID and/or the identifier of the disaster PLMN and/or the establishment cause and/or the location information of UE 2 and/or the status information of the second PLMN/disaster PLMN and/or the result of the authentication (e.g. success), the AMF 1 may determine the result of the registration request message (e.g. accept the registration). In an example action, the AMF 1 may send to the UE 2 via (R)AN 1 a registration accept message comprising at least one of: the allowed service type, the allowed service location area, the allowed service time duration, and/or the identifier of the serving PLMN. In response to the registration accept message received from the AMF 1, the UE 2 may determine service type and/or service time duration and/or service location area based on the allowed service type, the allowed service location area, the allowed service time duration, and/or the identifier of the serving PLMN received from the AMF 1.

As depicted in FIG. 15, the AMF 1 may receive from the UE 2 via the (R)AN 1 a PDU session establishment request message requesting establishment of a PDU session. The PDU session establishment request message may comprise at least one of: the disaster PLMN indication, requested service type, and/or the location information of UE 2. The AMF 1 may determine a result of the PDU session establishment request message based on the PDU session establishment request message and/or the status information of the second PLMN/disaster PLMN and/or the allowed service information (e.g. the allowed service type, the allowed service location area, the allowed service time duration) for the second PLMN/disaster PLMN. For example, the AMF 1 may verify whether the UE (current) location is in the coverage of the allowed service location area. For example, the AMF 1 may accept the PDU session establishment request message, and the AMF 1 may send to the SMF 1 a message (e.g. Namf_PDUSession_CreateSMContext Request) comprising at least one of: the disaster PLMN indication, requested service type, the location information of UE 2, and/or the allowed service information.

In response to the message received from the AMF 1, the SMF 1 may take one or more actions. In an example action, the SMF 1 may determine a result of the Namf_PDUSession_CreateSMContext Request message based on the information elements of the Namf_PDUSession_CreateSMContext Request and/or the status information of the second PLMN/disaster PLMN and/or the allowed service information (e.g. the allowed service type, the allowed service location area, the allowed service time duration) for the second PLMN/disaster PLMN. For example, the SMF 1 may verify whether the requested service type align with the allowed service type and determine the result (e.g. accept) of the PDU session establishment request. The SMF 1 may send to the UE 2 a response message (e.g. PDU session establishment response) comprising the result of the request. In an example action, based on the information elements of the Namf_PDUSession_CreateSMContext Request and/or the status information of the second PLMN/disaster PLMN and/or the allowed service information, the SMF 1 may determine at least one user plane rule for allowed service of UE 2 during the disaster. The at least one user plane rule may comprise the allowed service information (e.g. allowed service type, allowed service time) for UE 2. The SMF 1 may send to the UPF 1 a message (e.g. N4 session establishment/modification request) comprising the at least one user plane rule. There may be other actions between UE 2, (R)AN 1, AMF 1, SMF 1 and UPF 1 to complete the procedure of the PDU session establishment. In an example, after the PDU session has been established, the UE 2 may send a user plane packet to an application server via the UPF 1, the UPF 1 may enforce the at least one user plane rule by verifying whether the service type of the user plane packet is aligned with the allowed service type, and the UPF 1 may take action accordingly (e.g. forward the user plane packet, discard the user plane packet).

In an example, after the PDU session has been established, the AMF 1/SMF 1 may control/guarantee the UE 2 accesses the allowed service type in the allowed service location area and/or within the allowed service time duration. For example, when the UE 2 accesses a service that does not belong to the allowed service type and/or the UE 2 accesses the network for more than the allowed service time duration and/or the UE 2 moves out of the allowed service location area, the AMF 1/SMF 1 may stop the UE 2 service (e.g. terminate the PDU session).

After the PDU session established, AMF 1/SMF 1/UPF 1 may control/guarantee the UE 2 accesses the allowed service type in the allowed service location area and/or within the allowed service time duration. For example, when the UE 2 accesses a service that does not belong to the allowed service type and/or the UE 2 accesses the network for more than the allowed service time duration and/or the UE 2 moves out of the allowed service location area, the AMF 1/SMF 1 may stop the UE 2 service (e.g. terminate the PDU session).

Figure 20:
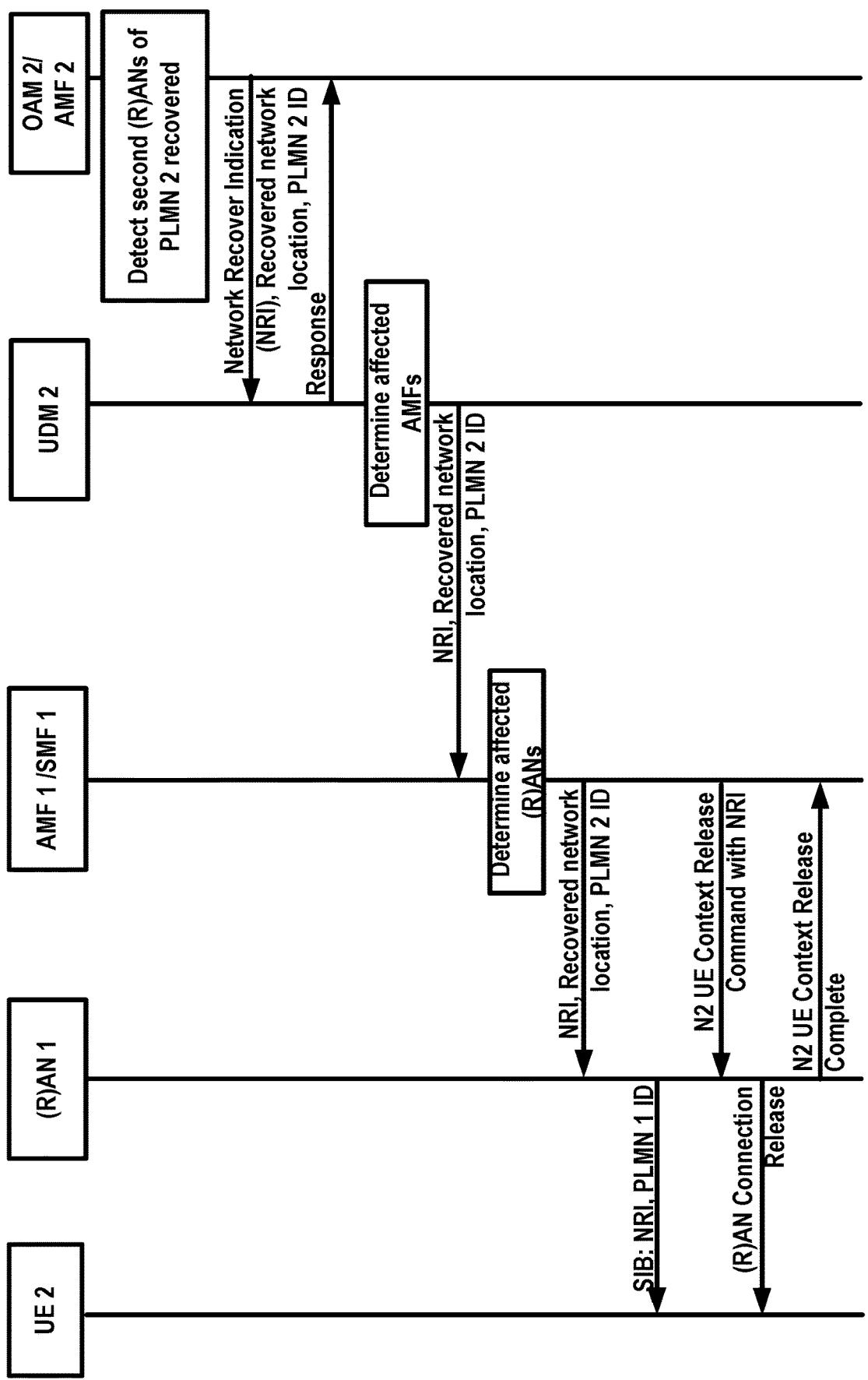
FIG. 20 is an example call flow as per an aspect of an embodiment of the present disclosure.

FIG. 20 is an example call flow which may comprise one or more actions. In an example, the second network function (e.g. AMF 2) of the second PLMN may detect or receive status information of the second PLMN. The status information of the second PLMN may comprise disaster recovery information and/or load information for at least one first network functions of the second PLMN. For example, the status information may comprise disaster recovery information for an access network of the second PLMN. For example, the status information may comprise overload recovery information for an AMF and/or (R)AN of the second PLMN. For example, the status information of the second PLMN may comprise at least one of the following information elements: a network recovery indication; a recovered network location; a network recovery time; a network overload recovery indication; a recovered overload network location, a network overload recovery time; an identifier of the at least one first network function (e.g. identifier/FQDN/IP address of (R)AN, identifier/FQDN/IP address of an AMF) of the second PLMN, or an identifier of the second PLMN. The network recovery indication may indicate at least one of the first network functions of the second PLMN is recovered from the disaster and may be able to provide service to a wireless device and/or a network. The recovered network location may indicate the location (e.g. geography location, tracking area, routing area, and/or the like) of the recovered network functions (e.g. at least one of the first network functions). The network recovery time may indicate the time (e.g. NTP time, UTC time and/or the like) of the failed/disaster network functions has been recovered. The network overload recovery indication may indicate at least one of the first network functions is recovered from the overload and may be able to provide service to a wireless device and/or a network. The recovered overload network location may indicate the location (e.g. geography location, tracking area, routing area, and/or the like) of the recovered overload network functions (e.g. at least one of the first network functions). The network overload recovery time may indicate the time (e.g. NTP time, UTC time and/or the like) of the overloaded network functions has been recovered.

In response to receiving the status information, the second network function (e.g. AMF 2) of the second PLMN may send a message (e.g. network status information notification) to the third network function (e.g. UDM 2) of the second PLMN. The network status information notification message may comprise status information of the second PLMN/recovered disaster PLMN, the status information of the second PLMN/recovered disaster PLMN may comprise at least one of the following information elements: the network recovery indication; the recovered network location; the network recovery time; the network overload recovery indication; the recovered overload network location, the network overload recovery time; the identifier of the at least one first network function (e.g. identifier/FQDN/IP address of (R)AN, identifier/FQDN/IP address of an AMF) of the second PLMN, or the identifier of the second PLMN/recovered disaster PLMN.

In response to the message received from the AMF 2, the UDM 2 may take one or more actions. In an example action, the UDM 2 may send to the AMF 2 a response message (e.g. network status information notification response). In an example action, the UDM 2 may determine affected AMFs/SMFs of the first PLMN. For example, the UDM 2 may determine the affected AMFs/SMFs (e.g. AMF 1/SMF 1) of the first PLMN based on the status information of the second PLMN/recovered disaster PLMN, e.g. based on the recovered network location and/or the recovered overload network location. For example, the UDM 2 may determine the affected AMFs/SMFs (e.g. AMF 1/SMF 1) of the first PLMN based on notification subscription, e.g. the AMFs of the first PLMN have subscribed for the update of the subscriber data to be notified, and/or the SMFs of the first PLMN have subscribed for the update of the session management subscriber data to be notified. In an example action, the UDM 2 may send to the AMF 1/SMF 1 a message (e.g. subscriber data update notification) comprising at least one of: the network recovery indication; the recovered network location; the network recovery time; the network overload recovery indication; the recovered overload network location, the network overload recovery time; the identifier of the at least one first network function (e.g. identifier/FQDN/IP address of (R)AN, identifier/FQDN/IP address of an AMF) of the second PLMN, or the identifier of the second PLMN/recovered disaster PLMN. For example, the UDM 2 may send to the AMF 1 the subscriber data update notification message. For example, the UDM 2 may send to the SMF 1 the subscriber data update notification message, and the SMF 1 may send to AMF 1 a message comprising the one or more information elements of the subscriber data update notification message.

In response to the message received from the UDM 2, the AMF 1 may take one or more actions. In an example action, the AMF 1 may determine affected/associated one or more base stations of the first PLMN based on the status information of the second PLMN/recovered disaster PLMN. For example, the AMF 1 may determine affected/associated one or more base stations (e.g. (R)AN 1) of the first PLMN based on the recovered network location of the second PLMN/recovered disaster PLMN. For example, the coverage of the affected/associated one or more base stations (e.g. (R)AN 1) of the first PLMN may comprise the recovered network location of the second PLMN/recovered disaster PLMN. For example, the coverage of the affected/associated one or more base stations (e.g. (R)AN 1) of the first PLMN may closed to the recovered network location of the second PLMN/recovered disaster PLMN. For example, the AMF 1 may determine affected/associated one or more base stations (e.g. (R)AN 1) based on the recovered overloaded network location of the second PLMN. For example, the coverage of the affected/associated one or more base stations (e.g. (R)AN 1) of the first PLMN may comprise the recovered overloaded network location of the second PLMN. For example, the coverage of the affected/associated one or more base stations (e.g. (R)AN 1) of the first PLMN may closed to the recovered overloaded network location of the second PLMN.

In an example action, the AMF 1 may send to the affected/associated one or more base stations (e.g. (R)AN 1) a message, the message may comprise the status information of the second PLMN/recovered disaster PLMN. For example, the AMF 1 may send to the (R)AN 1 a configuration message comprising at least one of: the network recovery indication; the recovered network location; the network recovery time; the network overload recovery indication; the recovered overload network location, the network overload recovery time; the identifier of the at least one first network function (e.g. identifier/FQDN/IP address of (R)AN, identifier/FQDN/IP address of an AMF) of the second PLMN, or the identifier of the second PLMN/ recovered disaster PLMN.

In response to the message received from the AMF 1, the base stations of the first PLMN (e.g. (R)AN 1) may transmit the identifier of the first PLMN. In an example, the base station of the first PLMN may transmit the identifier of the first PLMN in the coverage area. For example, the base station of the first PLMN may transmit a SIB and/or a MIB message to one or more wireless devices in the coverage area. The one or more wireless devices may be wireless devices of the first PLMN. The one or more wireless devices may be wireless devices of the second PLMN/disaster PLMN. In an example, the SIB and/or MIB message may comprise at least one of: a network recovery indication, an identifier of the second PLMN/recovered disaster PLMN, or an identifier of the first PLMN/serving PLMN.

In an example action, based on the status information of the second PLMN/recovered disaster PLMN and/or the local operator policy, the AMF 1 may determine to reject a wireless device of the second PLMN/recovered disaster PLMN to access to the first PLMN. In an example action, based on the status information of the second PLMN/ recovered disaster PLMN and/or the local operator policy, the AMF 1 may determine recalling resource allocated to the second PLMN/recovered disaster PLMN. For example, the AMF 1 may send to the (R)AN 1 an N2 UE context release command (cause) to release UE context/UE-associated logical NG-connection. The N2 UE context release command may comprise the network recovery indication and/or the identifier of the second PLMN/recovered disaster PLMN. For example, the cause value of the N2 UE context release command may comprise the network recovery indication. In response to the message received from the AMF 1, the (R)AN 1 may request the UE 2 to release (R)AN connection (e.g. RRC connection). Upon receiving (R)AN connection release confirmation from the UE, the (R)AN may delete the context of UE 2.

Figure 21:
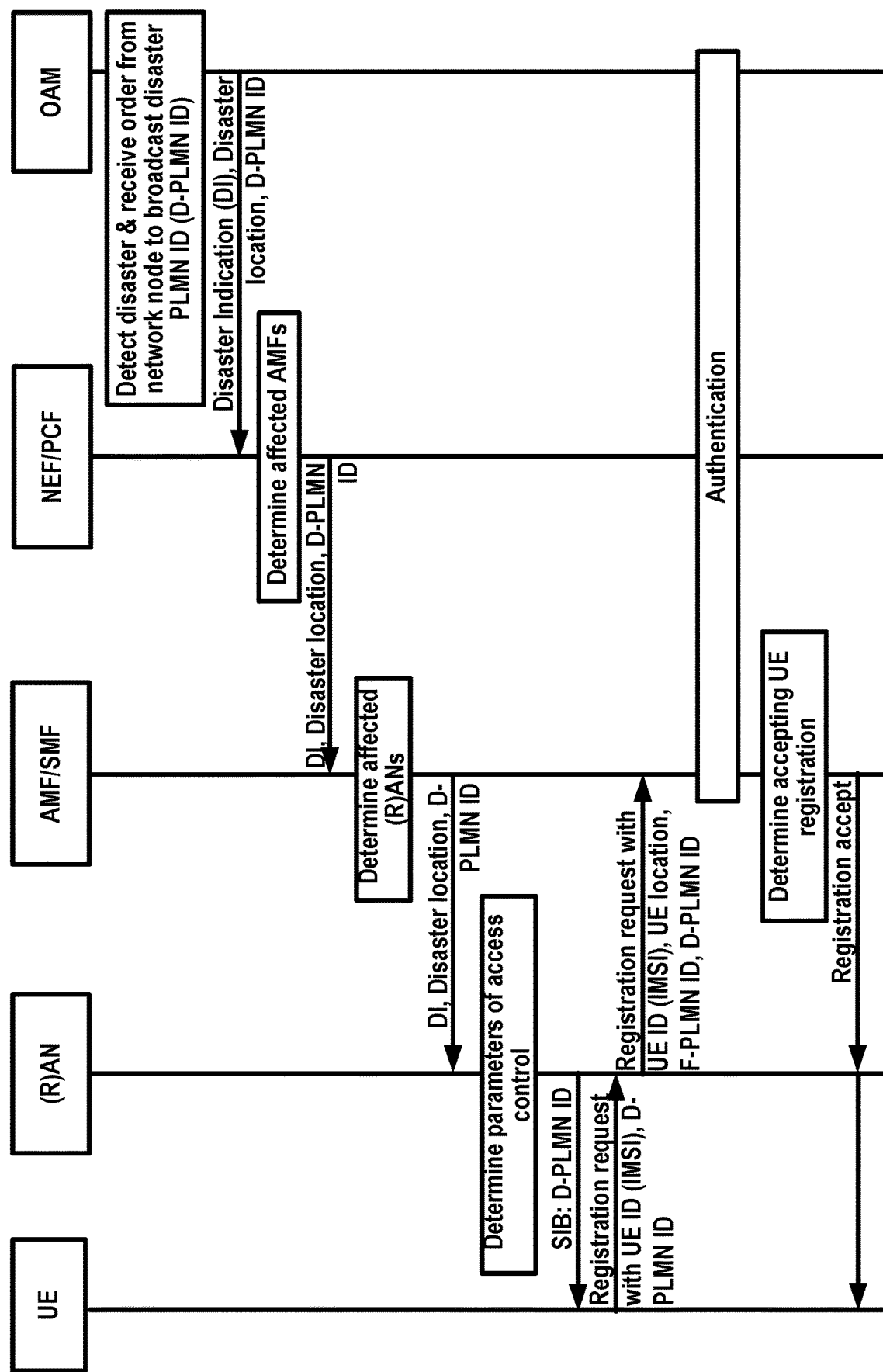
FIG. 21 is an example call flow as per an aspect of an embodiment of the present disclosure.

FIG. 21 shows example call flows which may comprise one or more actions. In an example, there may be a disaster in an area, and the disaster area may be covered by multiple PLMNs (e.g. PLMN 1, PLMN 2 and PLMN 3), where the multiple PLMNs may be operated by multiple operators. For example, operator 1 operates PLMN 1, operator 2 operates PLMN 2 and operator 3 operate PLMN 3. A regulatory body (e.g. FEMA, FCC, etc.) may determine to use a disaster PLMN ID in the disaster area during the disaster. The regulatory body may send an order to one of the operators (e.g. operator 1)/one of the PLMN (e.g. PLMN 1) to broadcast the disaster PLMN ID to all the wireless devices in the disaster area. The disaster PLMN ID may be used as a common/general PLMN identifier for all the wireless devices of all PLMNs in the disaster area. The wireless devices may be the wireless devices of all the PLMNs in the disaster area (e.g. PLMN 1, PLMN 2, and PLMN 3).

In an example, a first network function of a PLMN may detect a disaster (e.g. tornado, earthquake, tsunami) and/or receive an order of disaster from regulatory body (e.g. FEMA, FCC, etc.) and/or receive an order of disaster from an interworking network function. The first network function may be an OAM, AF, NRF, NWDAF, and/or the like.

In response to detecting the disaster and/or receiving the order of disaster, the first network function (e.g. OAM) may send a message (e.g. disaster information notification) to a second network function of the PLMN. The second network function may be a NEF, a PCF, a UDM, a NRF, a NWDAF, and/or the like. The disaster information notification message may comprise disaster information, wherein the disaster information may comprise at least one of the following information elements: a disaster indication; a disaster type, a disaster level, a disaster location; a disaster time; or a disaster PLMN ID. The disaster indication may indicate there is a disaster, or there may be a disaster. The disaster type may indicate the type of disaster (e.g. tornado, earthquake, tsunami). The disaster level may indicate the disaster level (e.g. level 1). The disaster location may indicate the location of the disaster (e.g. geography location, tracking area, routing area, and/or the like). The disaster time may indicate the time (e.g. NTP time, UTC time and/or the like) of the disaster. The disaster PLMN ID may be used as a PLMN identifier by all the wireless devices of all the PLMNs in the disaster area during the disaster.

In response to receiving the disaster information notification message, the second network function (e.g. NEF/ PCF) may determine affected/associated one or more SMFs and/or AMFs of the PLMN based on the disaster information. For example, the NEF/PCF may determine the affected/associated SMFs (e.g. SMF) and/or AMFs (e.g. AMF) based on the disaster location. For example, the coverage of the affected/associated SMFs (e.g. SMF) and/or AMFs (e.g. AMF) may comprise the disaster network location. For example, the coverage of the affected/associated SMFs (e.g. SMF) and/or AMFs (e.g. AMF) may close to the disaster network location.

In an example, the NEF/PCF may send to affected/ associated SMFs (e.g. SMF) and/or AMFs (e.g. AMF) of the PLMN a message comprising the disaster information. For example, the PCF may send to the SMF a Npcf_SMPolicyControl_UpdateNotify request message comprising the disaster information, and the SMF may send to the AMF a Namf_Communication_N1N2MessageTransfer message comprising the disaster information. For example, the PCF may send to the AMF a Npcf_UpdateNotify message comprising the disaster information. For example, the NEF may send to the AMF a disaster information notification message via the PCF and/or the SMF. The disaster information notification message may comprise the disaster information. In an example, the disaster information may comprise at least one of the following information elements: the disaster indication; the disaster type, the disaster level, the disaster location; the disaster time; or the disaster PLMN ID.

In response to the message received, the AMF/SMF may take one or more actions. In an example action, the SMF may determine affected/associated one or more AMFs of the PLMN based on the disaster information. For example, the SMF may determine affected/associated one or more AMFs (e.g. AMF) of the PLMN based on the disaster location, and the SMF may send to the AMF a Namf_Communication_N1N2MessageTransfer message comprising the disaster information. In an example action, the AMF may determine affected/associated one or more base stations of the PLMN based on the disaster information. For example, the AMF may determine affected/associated one or more base stations (e.g. (R)AN) of the PLMN based on the disaster location. For example, the coverage of the affected/associated one or more base stations (e.g. (R)AN) of the PLMN may comprise the disaster location. For example, the coverage of the affected/associated one or more base stations (e.g. (R)AN) of the PLMN may closed to the disaster location.

In an example action, based on the disaster information and/or the resource of the PLMN and/or the local operator policy, the AMF/SMF may determine allowed service information for the PLMN. The allowed service information may comprise at least one of: an allowed service type; an allowed service time duration; or an allowed service location area. The allowed service type may indicate at least one service type allowed for wireless device(s) when the wireless device(s) access to the PLMN in a condition (e.g. in a disaster condition). The allowed service time duration may indicate time duration (e.g. 30 minutes, 2 hours) allowed for the wireless device(s) when the wireless device(s) access to the PLMN in a condition (in a disaster condition). The allowed service location area may indicate location area allowed for the wireless device(s) when the wireless device(s) access to the PLMN in a condition (e.g. in a disaster condition). The location area may be a geographic area. For example, the location area may be a tracking area, a routing area, a cell area, and/or the like. For example, the location area may comprise a geography location and a radius centered on this geography location, and an example geographic location may comprise a longitude and a latitude.

In an example, the AMF/SMF may determine an allowed service type based on the disaster information and/or the resource of the PLMN and/or the local operator policy. For example, based on the disaster indication and/or the limited resource of the AMF/(R)AN and/or local policy, the AMF may determine "IoT" as an allowed service type. For example, based on the disaster indication and/or the limited resource of the SMF/UPF and/or local policy, the SMF may determine "URLLC" as an allowed service type. In an example, the AMF/SMF may determine an allowed service time duration based on the disaster information and/or the resource of the PLMN and/or the local operator policy. For example, based on the disaster indication and/or the disaster time and/or the resource of the AMF/(R)AN and/or local policy, the AMF may determine 2 hours for the allowed service time duration. For example, based on the disaster indication and/or the disaster time and/or the resource of the SMF/UPF and/or local policy, the AMF may determine 2 hours for the allowed service time duration. In an example, the AMF may determine an allowed service location area based on the disaster information and/or the resource of the PLMN and/or the local operator policy. For example, based on the disaster indication and/or the disaster location and/or the resource of the AMF/(R)AN and/or local policy, the AMF may determine a tracking area for the allowed service location area. For example, based on the disaster indication and/or the disaster location and/or the resource of the SMF/UPF and/or local policy, the SMF may determine a tracking area for the allowed service location area. In an example, the SMF may send to the AMF a message comprising the determined allowed service information.

In an example, the AMF may send to the affected/associated one or more base stations (e.g. (R)AN) a message (e.g. configuration message), the configuration message may comprise the disaster information and/or the allowed service information. For example, the AMF may send to the (R)AN a configuration message comprising at least one of: the disaster indication; the disaster type, the disaster level, the disaster location; the disaster time; the disaster PLMN ID; the allowed service type (e.g. URLLC); the allowed service time duration (e.g. 24 hours); or the allowed service location area (e.g. a tracking area).

In response to the message received from the AMF, the (R)AN may take one or more actions. In an example action, based on the configuration message (e.g. disaster information and/or the allowed service information), the (R)AN may determine limited services to the wireless device (e.g. no eMBB service is permitted during the disaster). For example, based on the configuration message (disaster information and/or the allowed service information), and/or based on the resource of the (R)AN, and/or in order to avoid over load during the disaster, the (R)AN may determine parameters of access control, where the parameters of access control may comprise cell barring (e.g. AC Barring for MO Data), access class barring (e.g. access class 12 is barred), and/or service specific access control barring (e.g. video over LTE is barred). In an example action, the base station (e.g. (R)AN) may transmit the disaster PLMN ID. In an example, the (R)AN may transmit the disaster PLMN ID in the coverage area. For example, the (R)AN may transmit a SIB and/or a MIB message to one or more wireless devices in the coverage area. The one or more wireless devices may be wireless devices of the PLMN. The one or more wireless devices may be wireless devices of other PLMNs, where the other PLMNs may be operated by other operators respectively. In an example, the SIB and/or MIB message may comprise at least one of: the disaster indication, the disaster PLMN ID, the allowed service type (e.g. eMBB), the allowed service location area (e.g. a tracking area), the allowed service time duration (e.g. 24 hours), parameters of access control, or the identifier of the PLMN.

In response to the SIB and/or MIB message received from the (R)AN, the wireless devices (e.g. UE) of the PLMN may take one or more actions. In an example action, based on the SIB and/or MIB message received from the (R)AN, the UE may determine to use disaster PLMN ID during the disaster. For example, the UE may determine to use the disaster PLMN ID based on the disaster indication, the disaster PLMN ID and/or the identifier of the PLMN. In an example action, based on the SIB and/or MIB message received from the (R)AN, the UE may determine a registration request message. For example, the UE may determine the registration request message based on the disaster indication, the disaster PLMN ID, the allowed service type, the allowed service location area, the allowed service time duration, and/or the identifier of the PLMN.

In an example action, the UE may send an message to the (R)AN. The AN message may comprise AN parameters and/or a registration request message. The AN parameters may include at least one of: an UE identity (e.g. 5G-S-TMSI/GUAMI/IMSI), a selected PLMN ID (e.g. the disaster PLMN ID), a disaster PLMN indication, requested NSSAI, and/or establishment cause. The establishment cause may indicate requesting establishment of an RRC connection to the disaster PLMN ID during the disaster. The registration request message may comprise at least one of: registration type, UE identity (e.g. SUCI/5G-GUTI/PEI), selected PLMN ID (e.g. the disaster PLMN ID), a disaster PLMN indication, last visited TAI (if available), security parameters, requested NSSAI, UE Radio Capability Update, UE MM Core Network Capability, PDU Session status, or List Of PDU Sessions To Be Activated). The disaster PLMN indication may indicate that the UE selects the disaster PLMN ID during the disaster.

In response to the AN message received, the (R)AN may select an AMF (e.g. AMF 1) based on the AN message. For example, the (R)AN may select an AMF based on the selected PLMN ID and/or the disaster PLMN indication and/or the establishment cause. The (R)AN may send to the AMF a N2 message comprising N2 parameters, the registration request message and/or UE policy container. The N2 parameters may comprise at least one of: the selected PLMN ID, location information and cell identity related to the cell in which the UE is camping, UE context request which may indicate that a UE context including security information needs to be setup at the (R)AN, and/or the establishment cause.

In response to the message received from the (R)AN, the AMF make take one or more actions. In an example action, the AMF may perform authentication for the UE. In an example action, based on the received registration request message and/or the message received from the SMF/NEF/PCF and/or the result of the authentication, the AMF may determine a result of the registration request message. For example, based on the selected PLMN ID and/or the disaster PLMN indication and/or the establishment cause and/or the location information of UE and/or the disaster information and/or the result of the authentication (e.g. success), the AMF may determine the result of the registration request message (e.g. accept the registration). In an example action, the AMF may send to the UE via (R)AN registration accept message comprising at least one of: the allowed service type, the allowed service location area, the allowed service time duration, and/or the disaster PLMN ID. In response to the registration accept message received from the AMF, the UE may determine service type and/or service time duration and/or service location area based on the allowed service type, the allowed service location area, the allowed service time duration, and/or the disaster PLMN ID received from the AMF.

As depicted in FIG. 15, the AMF (e.g. AMF 1 in FIG. 15) may receive from the UE (e.g. UE 2 in FIG. 15) via the (R)AN (e.g. (R)AN 1 in FIG. 15) a PDU session establishment request message requesting establishment of a PDU session. The PDU session establishment request message may comprise at least one of: the disaster PLMN indication, the disaster PLMN ID, requested service type, and/or the location information of UE. The AMF may determine a result of the PDU session establishment request message based on the PDU session establishment request message and/or the disaster information and/or the allowed service information (e.g. the allowed service type, the allowed service location area, the allowed service time duration). For example, the AMF may verify whether the UE (current) location is in the coverage of the allowed service location area. For example, the AMF may accept the PDU session establishment request message, and the AMF may send to the SMF (e.g. SFM 1 in FIG. 15) a message (e.g. Namf_PDUSession_CreateSMContext Request) comprising at least one of: the disaster PLMN indication, the disaster PLMN ID, requested service type, and/or the location information of UE.

In response to the message received from the AMF, the SMF may take one or more actions. In an example action, the SMF may determine a result of the Namf_PDUSession_CreateSMContext Request message based on the information elements of the Namf_PDUSession_CreateSMContext Request and/or the disaster information and/or the allowed service information (e.g. the allowed service type, the allowed service location area, the allowed service time duration). For example, the SMF may verify whether the requested service type align with the allowed service type and determine the result (e.g. accept) of the PDU session establishment request. The SMF may send to the UE a response message (e.g. PDU session establishment response) comprising the result of the request. In an example action, based on the information elements of the Namf_PDUSession_CreateSMContext Request and/or the disaster information and/or the allowed service information, the SMF may determine at least one user plane rule for allowed service of UE during the disaster. The at least one user plane rule may comprise the allowed service information (e.g. allowed service type, allowed service time) for UE. The SMF may send to UPF (e.g. UPF 1 in FIG. 15) a message (e.g. N4 session establishment/modification request) comprising the at least one user plane rule. There may be other actions between UE, (R)AN, AMF, SMF and UPF to complete the procedure of the PDU session establishment. In an example, after the PDU session has been established, the UE may send a user plane packet to an application server via the UPF, the UPF may enforce the at least one user plane rule by verifying whether the service type of the user plane packet is aligned with the allowed service type, and the UPF may take action accordingly (e.g. forward the user plane packet, discard the user plane packet).

After the PDU session established, AMF/SMF/UPF may control/guarantee the UE accesses the allowed service type in the allowed service location area and/or within the allowed service time duration. For example, when the UE accesses a service that does not belong to the allowed service type and/or the UE accesses the network for more than the allowed service time duration and/or the UE moves out of the allowed service location area, the AMF/SMF may stop the UE service (e.g. terminate the PDU session).

In an example, an access and mobility management function (AMF) of a first public land mobile network (PLMN) may receive from a first network function, status information indicating: a failure of a second PLMN providing services to a wireless device in a coverage area in response to a disaster; and an identifier of the second PLMN. The AMF may determine and based on the status information, at least one base station of the first PLMN. The AMF may determine and based on the status information, allowed service information for the second PLMN. The AMF may send to the at least one base station, a configuration message comprising: the status information; the allowed service information; and the identifier of the second PLMN. The AMF may receive from the at least one base station, a registration message of a wireless device, the registration message comprising the identifier of the second PLMN. In an example, the configuration message may indicate at least one of: one or more tracking areas to support the second PLMN; or one or more cells to support the second PLMN. In an example, the registration message may indicate the location of the wireless device. In an example, the AMF may determine a result of the registration message based on at least one of: the status information of the access network; and the location of the wireless device. In an example, the status information may comprise at least one of: a network disaster indication; a failed network location; a network disaster time; a network overload indication; an overloaded network location; a network overload time; an identifier of at least one first network function of the second PLMN; or an identifier of the second PLMN. In an example the status information may comprise at least one of: a network recovery indication; a recovered network location; a network recovery time; a network overload recovery indication; a recovered overload network location; a network overload recovery time; an identifier of at least one first network function of the second PLMN; or an identifier of the second PLMN. In an example, the first network function may comprise at least one of: a network exposure function; or a policy control function. In an example, the first network function may receive from a second network function of a second PLMN, the status information, wherein the second network function may comprise a UDM, an OAM, a NRF, a NWDAF, an AMF, and/or a PCF. In an example the first network function may determine and based on the status information, one or more affected AMFs and/or SMFs. In an example, the at least one base station may send to the wireless device, a SIB/MIB message comprising at least one of: a network disaster indication; the allowed service information; the identifier of the second PLMN; or an identifier of the first PLMN. In an example, the base station may provide to the wireless device, limited services compared to the services based on the disaster. In an example, the first PLMN and the second PLMN may belong to different service operators. In an example, the wireless device may be not configured to access the first PLMN when there is no disaster. In an example, the first PLMN may be not included in a roaming list of the wireless device. In an example, the wireless device may send to the AMF, a PDU session establishment request message comprising at least one of: a disaster PLMN indication; a requested service type; or location information of the wireless device. In an example, the AMF may determine a result of the request based on at least one of: Information elements of the PDU session establishment request message; the status information; or the allowed service information. In an example, the AMF may send a PDU session create request message comprising at least one of: the disaster PLMN indication; the requested service type; or the location information of the wireless device. In an example, the SMF may determine a result of the request based on at least one of: information elements of the PDU session create request message; the status information; or the allowed service information. In an example, the SMF may determine at least one user plane rule for the wireless device during the disaster based on at least one of: information elements of the PDU session create request message; the status information; or the allowed service information. In an example, the SMF may send to a UPF, the at least one user plane rule.

In an example, a base station of a first public land mobile network (PLMN) may receive a request indicating a second PLMN identifier of a second PLMN in response to a failure of the second PLMN providing services to a wireless device; and the base station may transmit the second PLMN identifier. In an example, a base station of a first public land mobile network (PLMN) may receive a request indicating: a failure of a second PLMN providing services to a wireless device in a coverage area in response to a disaster; and a second PLMN identifier of the second PLMN. The base station may transmit the second PLMN identifier in the coverage area. The base station may receive from the wireless device, a registration request comprising the second PLMN identifier. In an example, the base station may send to an access and mobility management function of the first PLMN, the registration request. In an example, the base station may determine and based on status information and/or allowed service information, limited services for the wireless device. In an example, the base station may determine parameters of access control for the wireless device based on at least one of: status information; allowed service information; resource of the base station; or overload control. In an example, the parameters of access control may comprise at least one of: cell barring; access class barring; or service specific access control barring. In an example, the first PLMN and the second PLMN may belong to different service operators. In an example, the wireless device may be not configured to access the first PLMN when there is no disaster. In an example, the first PLMN may be not included in a roaming list of the wireless device. In an example, the transmitting the second PLMN identifier may be in response to the disaster based on a requirement of a regulatory body. (examples, FCC, FEMA, etc.) In an example, the request may be received from an access and mobility management function or a session management function. In an example, a base station of a first public land mobile network (PLMN) may receive a request indicating a failure of a second PLMN providing services to a wireless device in a coverage area in response to a disaster. The base station may transmit a PLMN identifier based on the disaster in the coverage area. The base station may receive from the wireless device, a registration request comprising the PLMN identifier. The PLMN identifier may be a reserved for the disaster.

In an example, an access and mobility management function (AMF) of a first public land mobile network (PLMN) may receive from a first network function, a first message indicating status information of an access network for a second PLMN, the first message comprising the following information elements: a network disaster indication; a disaster network location; and an identifier of the second PLMN. The AMF may determine and based on the disaster network location, at least one affected base station of the first PLMN. The AMF may send to the at least one affected base station, a second message comprising the information elements of the first message. The AMF may receive from the at least one affected base station, a registration message of a wireless device of the second PLMN, the registration message comprising the identifier of the second PLMN and the location of the wireless device. The AMF may determine a result of the registration message based on at least one of: the network disaster indication; the disaster network location; the identifier of the second PLMN; or the location of the wireless device. In an example, the first network function may comprise at least one of: a network exposure function; or a policy control function. The recovered network location may comprise a geographic location.

In an example, an access and mobility management function (AMF) of a first public land mobile network (PLMN) may receive from a base station, a registration message of a wireless device of a second PLMN, the registration message comprising an identifier of the second PLMN and a location of the wireless device. The AMF may send to a unified data management (UDM), a subscription request message. The AMF may receive from the UDM, a subscription response message comprising status information of an access network. The AMF may determine a result of the registration message based on the status information of the access network; and the location of the wireless device. In an example, the subscription request message may comprise at least one of: an identity of the wireless device; the location of the wireless device; or the identifier of the second PLMN. In an example, the status information of the access network may comprise at least one of: a network disaster indication; a failed network location; a network disaster time; a network overload indication; an overloaded network location; a network overload time; an identifier of at least one first network function of the second PLMN; or an identifier of the second PLMN. In an example, the status information of the access network may comprise at least one of: a network recovery indication; a recovered network location; a network recovery time; a network overload recovery indication; a recovered overload network location; a network overload recovery time; an identifier of at least one first network function of the second PLMN; or an identifier of the second PLMN.

In an example, an access and mobility management function (AMF) of a public land mobile network (PLMN) may receive from a first network function, a first message comprising disaster information, wherein the disaster information comprises the following information elements: a disaster indication; a disaster type; a disaster level; a disaster location; a disaster time; and a disaster PLMN ID. The AMF may determine and based on the disaster location, at least one affected base station of the PLMN. The AMF may send to the at least one affected base station, a second message comprising the information elements of the first message. The AMF may receive from the at least one affected base station, a registration message of a wireless device, the registration message comprising the identifier of a disaster PLMN and the location of the wireless device. The AMF may determine a result of the registration message based on the disaster information; and the location of the wireless device.

According to various embodiments, a device such as, for example, a wireless device, off-network wireless device, a base station, a session management function, a policy control function, an application function, a access and mobility management function, a unified data management, a charging function and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 22:
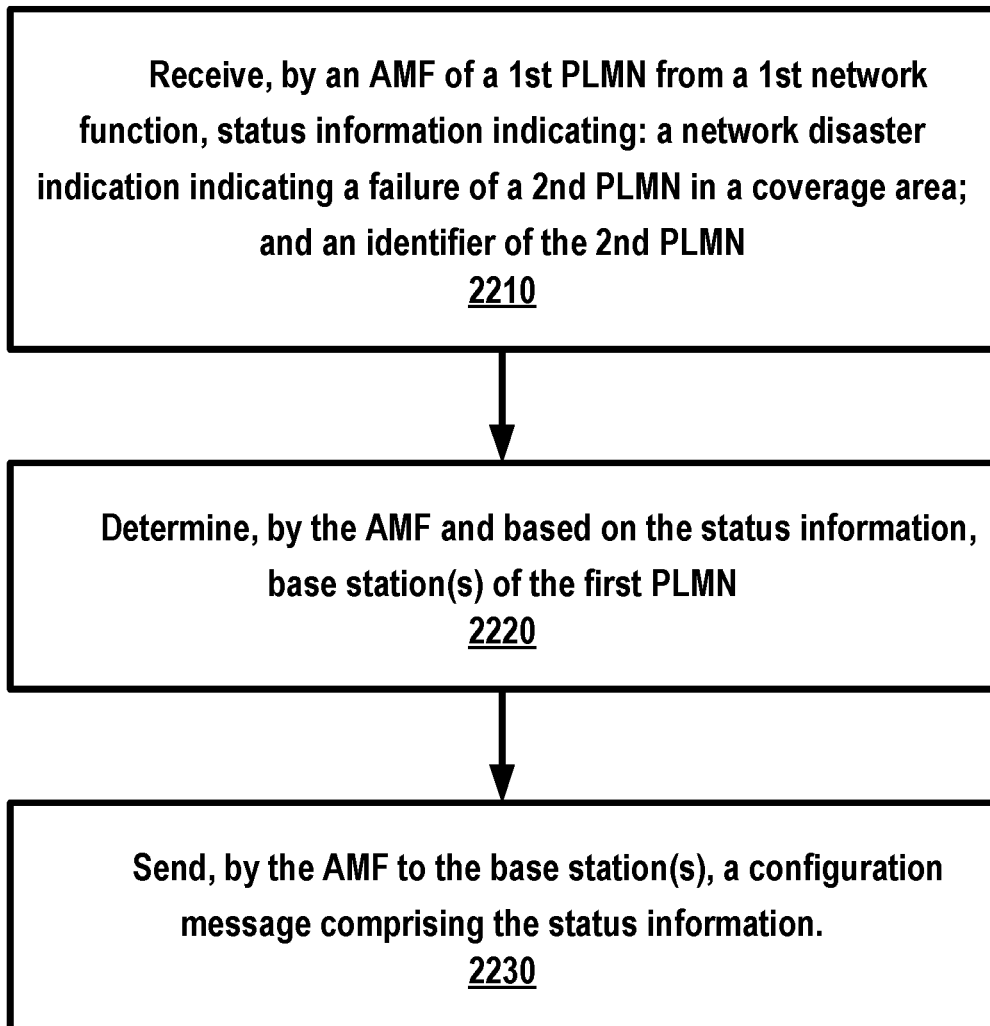
FIG. 22 is a flow diagram as per an aspect of an example embodiment of the present disclosure.

FIG. 22 is a flow diagram as per an aspect of an example embodiment of the present disclosure. At 2210, an access and mobility management function (AMF) of a first public land mobile network (PLMN) may receive from a first network function, status information comprising: a network disaster indication indicating a failure of a second PLMN in a coverage area; and an identifier of the second PLMN. At 2220, based on the status information, the AMF may determine at least one base station of the first PLMN. At 2230, the AMF may send a configuration message to the at least one base station. The configuration message may comprise the status information.

According to various embodiments, the configuration message may indicate one or more tracking areas to support the second PLMN. According to various embodiments, the configuration message may indicate one or more cells to support the second PLMN. According to various embodiments, the first PLMN and the second PLMN may belong to different service operators. According to various embodiments, the status information may comprise disaster information for an access network of the second PLMN. According to various embodiments, the status information may comprise overload information for an AMF of the second PLMN. According to various embodiments, the status information may comprise overload information for base station of the second PLMN. According to various embodiments, the status information may comprise a network disaster indication. According to various embodiments, the status information may comprise a failed network location. According to various embodiments, the status information may comprise a network disaster time. According to various embodiments, the status information may comprise a network overload indication. According to various embodiments, the status information may comprise an overloaded network location. According to various embodiments, the status information may comprise a network overload time. According to various embodiments, the status information may comprise an identifier of at least one first network function of the second PLMN. According to various embodiments, the status information may comprise. According to various embodiments, the status information may comprise an identifier of the second PLMN.

According to various embodiments, the status information may comprise a network recovery indication. According to various embodiments, the status information may comprise a recovered network location. According to various embodiments, the status information may comprise a network recovery time. According to various embodiments, the status information may comprise a network overload recovery indication. According to various embodiments, the status information may comprise a recovered overload network location. According to various embodiments, the status information may comprise a network overload recovery time. According to various embodiments, the status information may comprise an identifier of at least one first network function of the second PLMN. According to various embodiments, the status information may comprise an identifier of the second PLMN. According to various embodiments, the first network function may comprise a NEF. According to various embodiments, the first network function may comprise a PCF. According to various embodiments, the first network function may comprise a UDM. According to various embodiments, the first network function may comprise an OAM.

According to various embodiments, the first network function may comprise an AMF. According to various embodiments, the first network function may comprise an NRF. According to various embodiments, the first network function may comprise a NWDAF. According to various embodiments, the first network function may receive the status information from a second network function of a second PLMN, wherein the second network function may comprise a UDM, an OAM, a NRF, a NWDAF, an AMF, and/or a PCF.

According to various embodiments, based on the status information, the first network function may determine one or more affected AMFs and/or SMFs of the first PLMN. According to various embodiments, the AMF may receive a registration message of a wireless device from the at least one base station. The registration message may comprise the identifier of the second PLMN and/or a location of the wireless device. According to various embodiments, based on the status information of an access network and/or the location of the wireless device, the AMF may determine a result of the registration message. According to various embodiments, the at least one base station may send a SIB/MIB message to the wireless device. The SIB/MIB message may comprise a network disaster indication. The SIB/MIB message may comprise allowed service information. The SIB/MIB message may comprise the identifier of the second PLMN. The SIB/MIB message may comprise an identifier of the first PLMN. According to various embodiments, the allowed service information may comprise an allowed service type. According to various embodiments, the allowed service information may comprise an allowed service time duration. According to various embodiments, the allowed service information may comprise an allowed service location area.

According to various embodiments, the wireless device may send a PDU session establishment request message to the AMF. The PDU session establishment request message may comprise a disaster PLMN indication. The PDU session establishment request message may comprise a requested service type. The PDU session establishment request message may comprise location information of the wireless device. According to various embodiments, the AMF may determine a result of the PDU session establishment request message based on information elements of the PDU session establishment request message. According to various embodiments, the AMF may determine a result of the PDU session establishment request message based on the status information. According to various embodiments, the AMF may determine a result of the PDU session establishment request message based on an allowed service information. According to various embodiments, the AMF may send a PDU session create request message to an SMF. The PDU session create request message may comprise the disaster PLMN indication. The PDU session create request message may comprise the requested service type. The PDU session create request message may comprise the location information of the wireless device. According to various embodiments, the SMF may determine a result of the PDU session create request message based on information elements of the PDU session create request message. According to various embodiments, the SMF may determine a result of the PDU session create request message based on the status information. According to various embodiments, the SMF may determine a result of the PDU session create request message based on the allowed service information. According to various embodiments, the SMF may determine at least one user plane rule for the wireless device during a disaster based on information elements of the PDU session create request message. According to various embodiments, the SMF may determine at least one user plane rule for the wireless device during a disaster based on the status information. According to various embodiments, the SMF may determine at least one user plane rule for the wireless device during a disaster based on the allowed service information. According to various embodiments, the SMF may send the at least one user plane rule to a UPF. According to various embodiments, the wireless device may not be configured to access the first PLMN when there is no disaster. According to various embodiments, the first PLMN may not be included in a roaming list of the wireless device.

Figure 23:
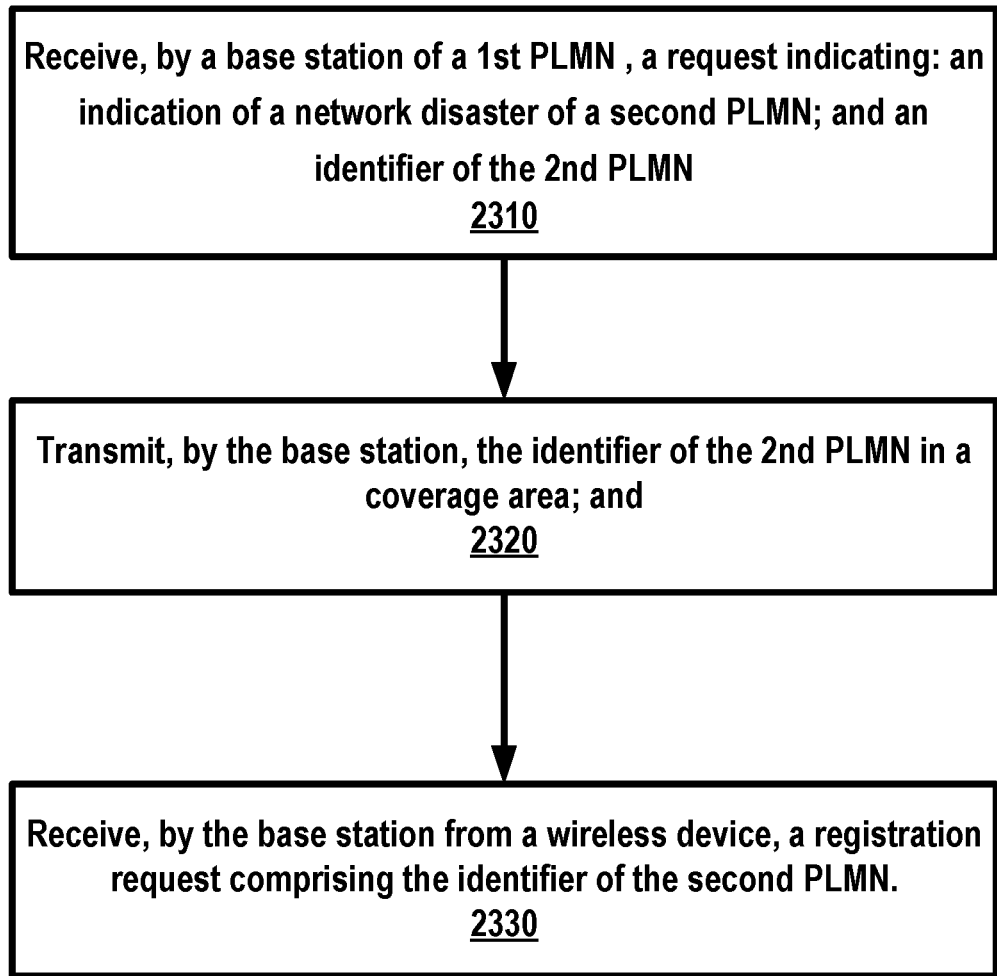
FIG. 23 is a flow diagram as per an aspect of an example embodiment of the present disclosure.

FIG. 23 is a flow diagram as per an aspect of an example embodiment of the present disclosure. At 2310, a base station of a first public land mobile network (PLMN) may receive a request, the request may indicate an indication of a network disaster of a second PLMN; and an identifier of the second PLMN. At 2320, the base station may transmit the identifier of the second PLMN in a coverage area. At 2330, the base station may receive a registration request from a wireless device. The registration request may comprise the identifier of the second PLMN.

According to various embodiments, the base station may send the registration request to an access and mobility management function of the first PLMN. According to various embodiments, based on status information and/or allowed service information, the base station may determine limited services for the wireless device. According to various embodiments, the base station may determine parameters of access control for the wireless device based on status information. According to various embodiments, the base station may determine parameters of access control for the wireless device based on allowed service information. According to various embodiments, the base station may determine parameters of access control for the wireless device based on resource of the base station. According to various embodiments, the base station may determine parameters of access control for the wireless device based on overload control. According to various embodiments, the parameters of access control may comprise cell barring; access class barring. According to various embodiments, the parameters of access control may comprise service specific access control barring. According to various embodiments, the first PLMN and the second PLMN may belong to different service operators. According to various embodiments, the wireless device may not be configured to access the first PLMN when there is no disaster. According to various embodiments, first PLMN may not be included in a roaming list of the wireless device. According to various embodiments, transmitting of the identifier of the second PLMN may be in response to a disaster based on a requirement of a regulatory body.

According to various embodiments, the request may be received from an access and mobility management function or a session management function. According to various embodiments, a base station of a first public land mobile network (PLMN) may receive a request. The request may indicate a failure of a second PLMN providing services to a wireless device in a coverage area in response to a disaster. According to various embodiments, based on the disaster in the coverage area, the base station may transmit a PLMN identifier. According to various embodiments, the base station may receive a registration request from the wireless device. The registration request may comprise the PLMN identifier. According to various embodiments, the PLMN identifier is a reserved for the disaster. According to various embodiments, a base station of a first public land mobile network (PLMN) may receive a request. The request may indicate a second PLMN identifier of a second PLMN in response to a failure of the second PLMN providing services to a wireless device. According to various embodiments, the base station may transmit the second PLMN identifier.

Figure 24:
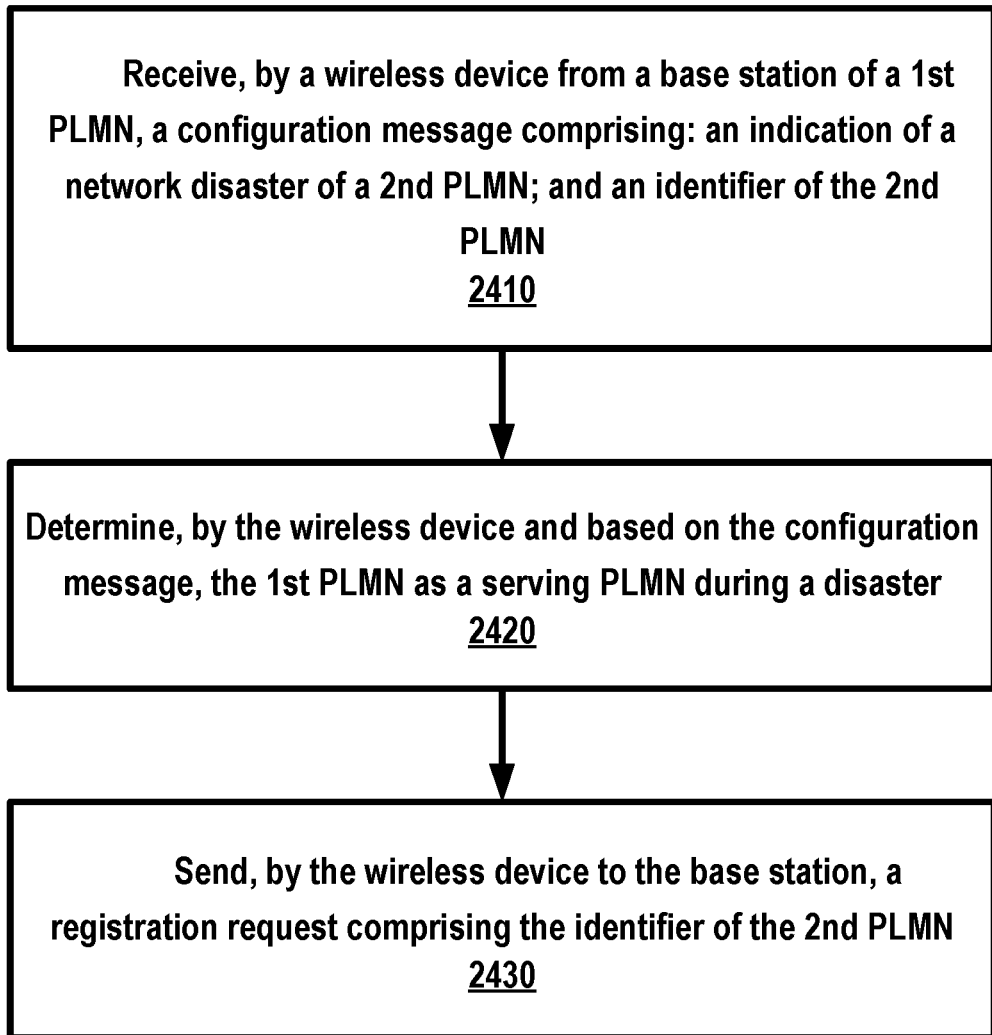
FIG. 24 is a flow diagram as per an aspect of an example embodiment of the present disclosure.

FIG. 24 is a flow diagram as per an aspect of an example embodiment of the present disclosure. At 2410, a wireless device may receive a configuration message from a base station of a first public land mobile network (PLMN). The configuration message may comprise an indication of a network disaster of a second PLMN; and an identifier of the second PLMN. At 2420, based on the configuration message, the wireless device may determine the first PLMN as a serving PLMN during a disaster. At 2430, the wireless device may send a registration request to the base station. The registration request may comprise the identifier of the second PLMN.

According to various embodiments, an access and mobility management function (AMF) of a first public land mobile network (PLMN) may receive a first message from a first network function. The first message may indicate status information of an access network for a second PLMN, the first message may comprise the following information elements: a network disaster indication; a disaster network location; and/or an identifier of the second PLMN. According to various embodiments, based on the disaster network location, the AMF may determine at least one affected base station of the first PLMN. According to various embodiments, the AMF may send a second message to the at least one affected base station. The second message may comprise the information elements of the first message. According to various embodiments, the AMF may receive a registration message of a wireless device of the second PLMN from the at least one affected base station. The registration message may comprise the identifier of the second PLMN and a location of the wireless device. According to various embodiments, the AMF may determine a result of the registration message based on the network disaster indication. According to various embodiments, the AMF may determine a result of the registration message based on the disaster network location. According to various embodiments, the AMF may determine a result of the registration message based on the identifier of the second PLMN. According to various embodiments, the AMF may determine a result of the registration message based on the location of the wireless device. According to various embodiments, the first network function may comprise a network exposure function and/or a policy control function. According to various embodiments, a recovered network location may comprise a geographic location.

Figure 25:
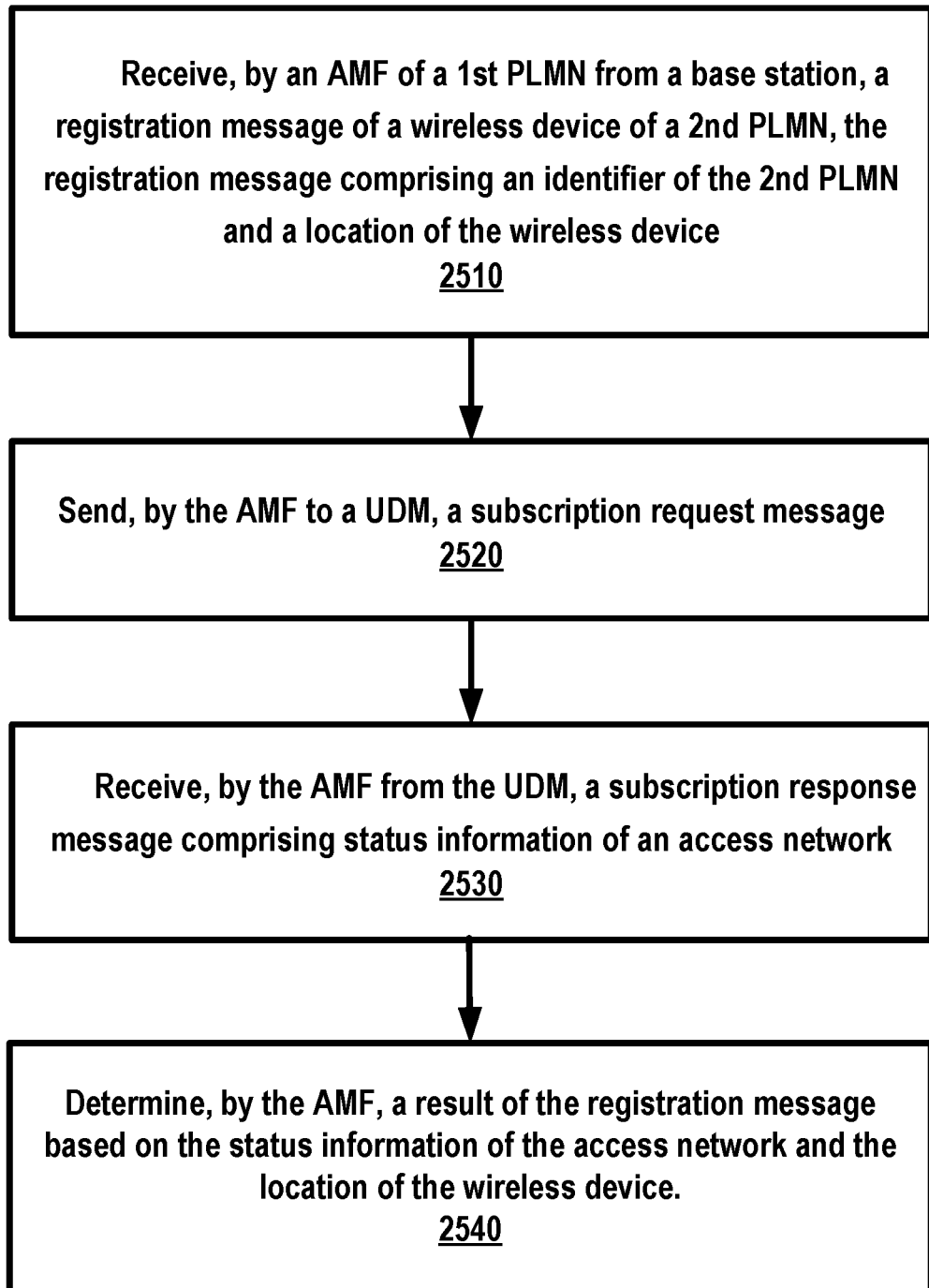
FIG. 25 is a flow diagram as per an aspect of an example embodiment of the present disclosure.

FIG. 25 is a flow diagram as per an aspect of an example embodiment of the present disclosure. At 2510, an access and mobility management function (AMF) of a first public land mobile network (PLMN) may receive a registration message of a wireless device of a second PLMN from a base station. The registration message may comprise an identifier of the second PLMN and a location of the wireless device. At 2520, the AMF may send a subscription request message to a unified data management (UDM). At 2530, the AMF may receive a subscription response message from the UDM. The subscription response message may comprise status information of an access network. At 2540, the AMF may determine a result of the registration message based on the status information of the access network and the location of the wireless device.

According to various embodiments, the subscription request message may comprise an identity of the wireless device. According to various embodiments, the subscription request message may comprise the location of the wireless device. According to various embodiments, the subscription request message may comprise the identifier of the second PLMN. According to various embodiments, the status information of the access network may comprise a network disaster indication. According to various embodiments, the status information of the access network may comprise a failed network location. According to various embodiments, the status information of the access network may comprise a network disaster time. According to various embodiments, the status information of the access network may comprise a network overload indication. According to various embodiments, the status information of the access network may comprise an overloaded network location. According to various embodiments, the status information of the access network may comprise a network overload time. According to various embodiments, the status information of the access network may comprise an identifier of at least one first network function of the second PLMN. According to various embodiments, the status information of the access network may comprise an identifier of the second PLMN. According to various embodiments, the status information of the access network may comprise a network recovery indication. According to various embodiments, the status information of the access network may comprise a recovered network location. According to various embodiments, the status information of the access network may comprise a network recovery time. According to various embodiments, the status information of the access network may comprise a network overload recovery indication. According to various embodiments, the status information of the access network may comprise a recovered overload network location. According to various embodiments, the status information of the access network may comprise a network overload recovery time. According to various embodiments, the status information of the access network may comprise an identifier of at least one first network function of the second PLMN. According to various embodiments, the status information of the access network may comprise an identifier of the second PLMN.

According to various embodiments, an access and mobility management function (AMF) of a public land mobile network (PLMN) may receive a first message from a first network function. The first message may comprise disaster information. The disaster information may comprise the following information elements: a disaster indication; a disaster type; a disaster level; a disaster location; a disaster time; and/or an identifier of a disaster PLMN. According to various embodiments, based on the disaster location, the AMF may determine at least one affected base station of the PLMN. According to various embodiments, the AMF may send a second message to the at least one affected base station. The second message may comprise the information elements of the first message. According to various embodiments, the AMF may receive a registration message of a wireless device from the at least one affected base station. The registration message may comprise the identifier of the disaster PLMN and a location of the wireless device. According to various embodiments, the AMF may determine a result of the registration message based on the disaster information and the location of the wireless device.

Figure 26:
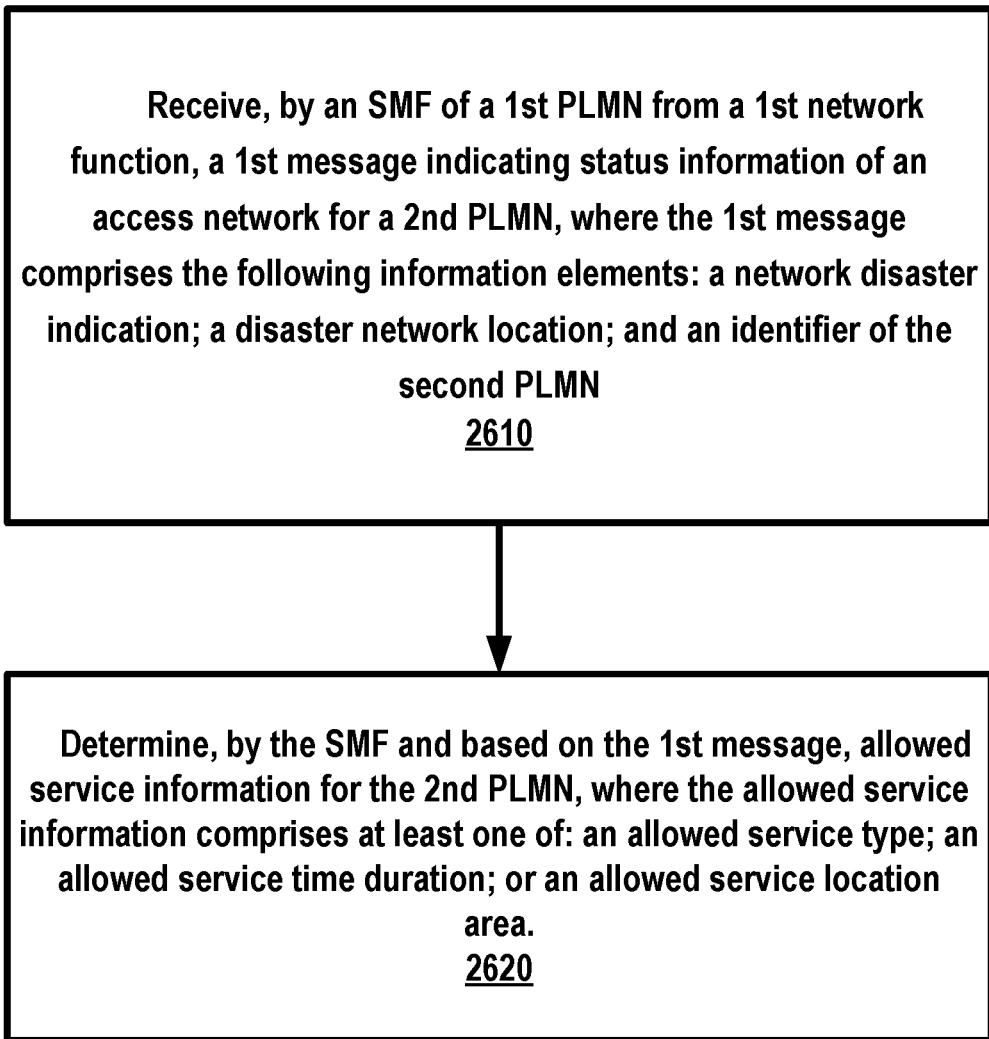
FIG. 26 is a flow diagram as per an aspect of an example embodiment of the present disclosure.

FIG. 26 is a flow diagram as per an aspect of an example embodiment of the present disclosure. At 2610, a session management function (SMF) of a first public land mobile network (PLMN) may receive a first message from a first network function. The first message may indicate status information of an access network for a second PLMN. The first message may comprise the following information elements a network disaster indication; a disaster network location; and an identifier of the second PLMN. At 2620, based on the first message, the SMF may determine allowed service information for the second PLMN, wherein the allowed service information may comprise at least one of: an allowed service type; an allowed service time duration; and/or an allowed service location area.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed examples may be combined to create further examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, FORTRAN, JAVA, BASIC, MATLAB or the like) or a modeling/simulation program such as SIMULINK, STATEFLOW, GNU OCTAVE, or LAB VIEWMATHSCRIPT. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   transmitting, by a base station of a first public land mobile network (PLMN) to a wireless device, an indication of a failure of a second PLMN comprising a PLMN identifier of the second PLMN; and
   receiving, by the base station from the wireless device, a registration request indicating the failure of the second PLMN, the registration request comprising:
      one or more of a subscriber concealed identifier (SUCI) or a permanent equipment identifier (PEI) of the wireless device; and
      the PLMN identifier of the second PLMN.

2. The method of claim 1, wherein the registration request indicates a network disaster of the second PLMN.

3. The method of claim 1, further comprising transmitting, to the wireless device, a configuration message.

4. The method of claim 3, wherein the configuration message comprises the indication of the failure of the second PLMN.

5. The method of claim 3, wherein the configuration message comprises the PLMN identifier of the second PLMN.

6. The method of claim 1, further comprising sending, by the base station to an access and mobility management function (AMF), the registration request.

7. The method of claim 1, wherein the first PLMN is a serving PLMN during a network disaster of the second PLMN.

8. The method of claim 1, further comprising transmitting, by the base station to the wireless device, a registration accept message.

9. The method of claim 1, wherein the registration request does not comprise a 5G globally unique temporary identifier (5G-GUTI) of the wireless device.

10. The method of claim 1, wherein the registration request indicates a registration type.

11. A base station of a first public land mobile network (PLMN) comprising:
   one or more processors; and
   memory storing instructions that, when executed by the one or more processors, cause the base station to:
      transmit, to a wireless device, an indication of a failure of a second PLMN comprising a PLMN identifier of the second PLMN; and receive, from the wireless device, a registration request indicating the failure of the second PLMN, the registration request comprising:
one or more of a subscriber concealed identifier (SUCI) or a permanent equipment identifier (PEI) of the wireless device; and
the PLMN identifier of the second PLMN.

12. The base station of claim 11, wherein the registration request indicates a network disaster of the second PLMN.

13. The base station of claim 11, wherein the instructions further cause the base station to transmit, to the wireless device, a configuration message.

14. The base station of claim 13, wherein the configuration message comprises the indication of the failure of the second PLMN.

15. The base station of claim 13, wherein the configuration message comprises the PLMN identifier of the second PLMN.

16. The base station of claim 11, wherein the instructions further cause the base station to send, to an access and mobility management function (AMF), the registration request.

17. The base station of claim 11, wherein the first PLMN is a serving PLMN during a network disaster of the second PLMN.

18. The base station of claim 11, wherein the instructions further cause the base station to transmit, to the wireless device, a registration accept message.

19. The base station of claim 11, wherein the registration request does not comprise a 5G globally unique temporary identifier (5G-GUTI) of the wireless device.

20. A system comprising:
a wireless device comprising: one or more processors; and memory storing instructions that, when executed by the one or more processors, cause the wireless device to:
receive, from a base station of a first public land mobile network (PLMN), an indication of a failure of a second PLMN comprising a PLMN identifier of the second PLMN; and
in response to the failure, send, to an access and mobility management function, a registration request indicating the failure of the second PLMN, the registration request comprising:
one or more of a subscriber concealed identifier (SUCI) or a permanent equipment identifier (PEI) of the wireless device; and
the PLMN identifier of the second PLMN; and
the base station, wherein the base station comprises: one or more processors; and memory storing instructions that, when executed by the one or more processors, cause the base station to:
send, to the wireless device, the indication of the failure of the second PLMN comprising the PLMN identifier of the second PLMN; and
receive the registration request.

* * * * *